US012708938B2

(12) United States Patent
Jangam et al.

(10) Patent No.: US 12,708,938 B2
(45) Date of Patent: Aug. 18, 2026

(54) THREE-DIMENSIONAL PRINTING

(71) Applicant: PERIDOT PRINT LLC, Palo Alto, CA (US)

(72) Inventors: John Samuel Dilip Jangam, Palo Alto, CA (US); Thomas Craig Anthony, Palo Alto, CA (US); Kristopher Erickson, Palo Alto, CA (US); Lihua Zhao, Palo Alto, CA (US)

(73) Assignee: Peridot Print LLC, Palo Alto, CA (US)

(*) Notice: Subject to any disclaimer, the term of this patent is extended or adjusted under 35 U.S.C. 154(b) by 590 days.

(21) Appl. No.: 17/637,481

(22) PCT Filed: Jan. 29, 2020

(86) PCT No.: PCT/US2019/061783
§ 371 (c)(1),
(2) Date: Feb. 23, 2022

(87) PCT Pub. No.: WO2021/154199
PCT Pub. Date: Aug. 5, 2021

(65) Prior Publication Data

US 2022/0362850 A1 Nov. 17, 2022

(51) Int. Cl.
*B22F 10/14* (2021.01)
*B22F 1/00* (2022.01)
(Continued)

(52) U.S. Cl.
CPC ................ *B22F 10/14* (2021.01); *B22F 1/09* (2022.01); *B22F 10/39* (2021.01); *B33Y 70/00* (2014.12); *B22F 2301/10* (2013.01); *B22F 2301/15* (2013.01); *B22F 2301/255* (2013.01); *B22F 2999/00* (2013.01); *B33Y 10/00* (2014.12); *B33Y 30/00* (2014.12); *B33Y 70/10* (2020.01)

(58) Field of Classification Search
CPC ................................ B22F 10/14; B22F 10/39
See application file for complete search history.

(56) References Cited

U.S. PATENT DOCUMENTS

| | | | |
|---|---|---|---|
| 8,837,672 | B2 | 9/2014 | Nance et al. |
| 9,771,629 | B2 | 9/2017 | Soloway |

(Continued)

FOREIGN PATENT DOCUMENTS

| | | | |
|---|---|---|---|
| EP | 2001656 | A2 | 12/2008 |
| WO | 2016/165747 | A1 | 10/2016 |

(Continued)

*Primary Examiner* — Sally A Merkling
*Assistant Examiner* — Sean P. O'Keefe
(74) *Attorney, Agent, or Firm* — Dierker & Kavanaugh, P.C.

(57) ABSTRACT

The present disclosure relates to a method of three-dimensional (3D) printing a 3D printed object. The method comprises: selectively jetting a marking agent onto a first region of build material, wherein the build material comprises at least one meta and/or ceramic; selectively jetting a binding agent onto at least a portion of the build material; and binding the build material to form a layer; such that the marking agent is incorporated in the metal part in a predetermined arrangement that forms a detectable marker in the 3D printed object. The disclosure also relates to a multi-fluid inkjet kit for 3D printing.

15 Claims, 8 Drawing Sheets

(51) Int. Cl.

| | |
|---|---|
| ***B22F 10/39*** | (2021.01) |
| ***B33Y 10/00*** | (2015.01) |
| ***B33Y 70/00*** | (2020.01) |
| ***B33Y 70/10*** | (2020.01) |
| *B33Y 30/00* | (2015.01) |

(56) References Cited

U.S. PATENT DOCUMENTS

| | | | | |
|---|---|---|---|---|
| 9,815,241 | B2 | 11/2017 | Pforte et al. | |
| 9,908,819 | B1 * | 3/2018 | Kollenberg | C04B 35/63 |
| 10,093,123 | B2 | 10/2018 | Schwarze et al. | |
| 2012/0168684 | A1 | 7/2012 | Magdassi et al. | |
| 2016/0325356 | A1 * | 11/2016 | Hirata | B29C 64/165 |
| 2018/0292337 | A1 * | 10/2018 | Gold | G01N 27/902 |
| 2019/0111480 | A1 * | 4/2019 | Barbati | C04B 35/565 |
| 2019/0259517 | A1 * | 8/2019 | Vaseem | B29C 64/112 |
| 2019/0344381 | A1 | 11/2019 | Pomerantz et al. | |

FOREIGN PATENT DOCUMENTS

| | | | | |
|---|---|---|---|---|
| WO | WO-2018022034 | A1 * | 2/2018 | B33Y 50/02 |
| WO | 2019/023395 | A1 | 1/2019 | |

* cited by examiner

THREE-DIMENSIONAL PRINTING

BACKGROUND

Three-dimensional (3D) printing is an additive printing process used to make three-dimensional solid objects from a digital model. Some 3D printing techniques may be considered additive processes because they involve the application of successive layers of material. This is unlike customary machine processes, which often rely upon the removal of material to create the final part.

BRIEF DESCRIPTION OF THE DRAWING

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
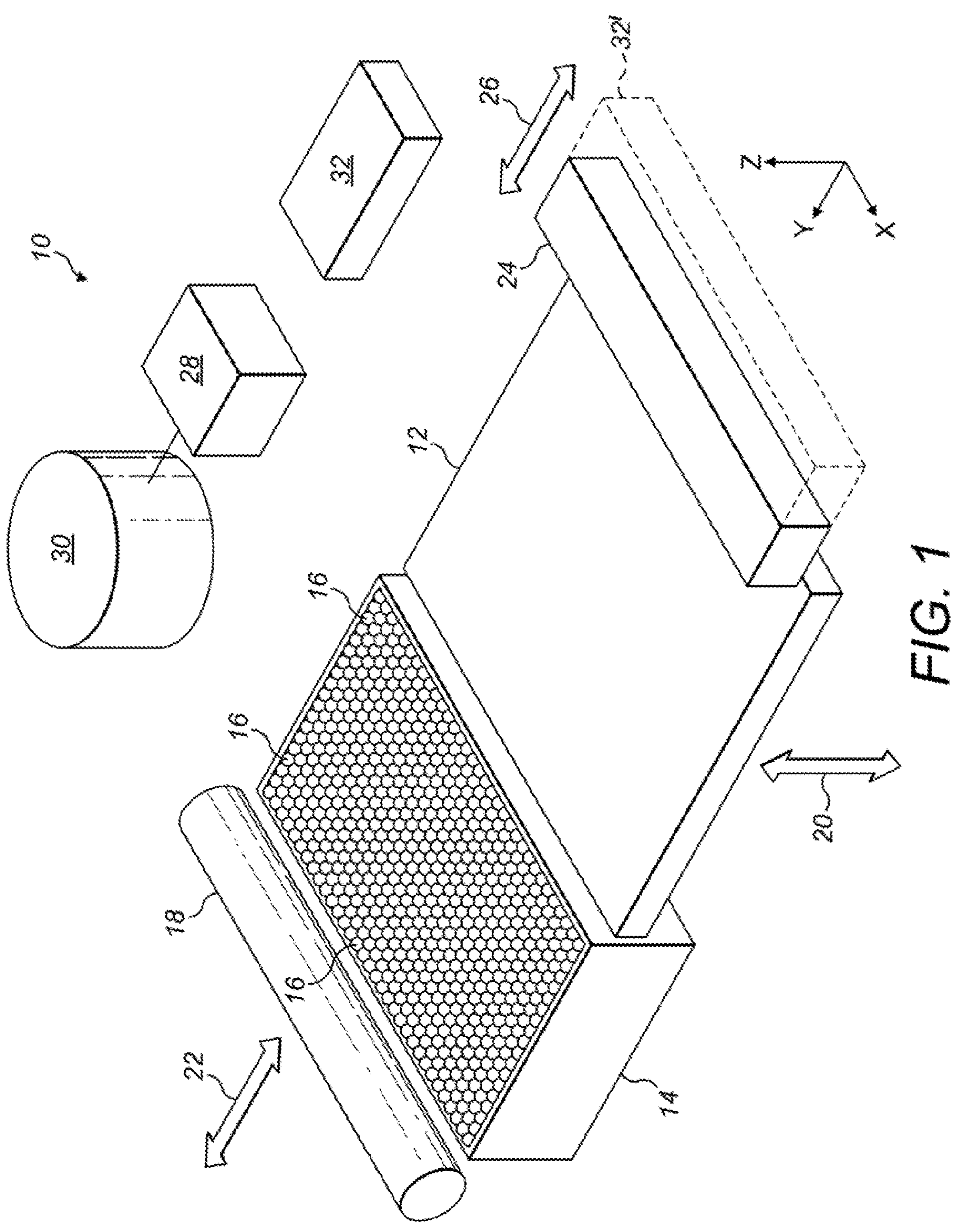
FIG. 1 is a simplified isometric view of an example 3D printing system that may be used to perform a 3D printing method according to an example of the present disclosure.

The present disclosure relates to a method of three-dimensional (3D) printing a 3D printed object. The method comprises:

- selectively jetting a marking agent onto a first region of build material, wherein the build material comprises at least one metal and/or ceramic;
- selectively jetting a binding agent onto at least a portion of the build material; and
- binding the build material to form a layer; such that the marking agent is incorporated in the metal part in a predetermined arrangement that forms a detectable marker in the 3D printed object.

The method may further comprise sintering the build material e.g. after binding.

The marking agent may be selectively jetted onto a first region of the build material based on a 2D or 3D object model of the detectable marker. The model may comprise or be derived from a set of programming instructions defining how to print or form the detectable marker within the 3D printed object. Similarly, the binding agent may be selectively jetted onto at least a portion of the build material based on a model of the 3D object to be printed. The model may comprise or may be derived from a set of programming instructions defining how to print the 3D object.

In some circumstances, it may be useful for manufacturers to be able to track and trace metal 3D printed objects that are produced. For example, 3D printed parts may be assigned a unique identification number that designates information regarding e.g. the identity, origin or other characterising information on the part. This unique identification number may be imprinted into the parts produced.

In the 3D printing method of the present disclosure, a marking agent is jetted onto a first region of build material. A binding agent is jetted onto at least a portion of the first region, and the build material in contact with the binding agent is bound to form a layer, such that the marking agent is incorporated in the 3D printed object in a predetermined arrangement that forms a detectable marker in the 3D printed object. The predetermined arrangement of the marking agent may act itself as the detectable marker. Alternatively, the predetermined arrangement of the marking agent may react e.g. upon exposure to elevated temperatures (e.g. during binding and/or sintering) to form the detectable marker.

By incorporating the marking agent into a 3D printed object during the course of printing, the marking agent can be incorporated within the 3D printed object and/or on at least a part of an outer surface of the 3D printed object. In one example, the detectable marker encodes data. The marker may enable the part to be identified, located and/or tracked. The marker may encode data in machine-readable form.

In some examples, the marker may provide encode information relating to subsequent processing steps. For instance, the marker may inform the user where to perform e.g. a milling or plating operation.

The marker may be located at at least one designated location in the 3D printed object (e.g. metal part). In this example, the 3D printed object may be analyzed at the designated location for the presence of the marker.

In one example, the metal-containing marking agent is incorporated in the 3D printed object in a predetermined arrangement that forms a marker that is not detectable by visual inspection of the 3D printed object. For example, the marker itself may be invisible. Alternatively or additionally, the marker may not be located on an outside surface of the 3D printed object.

The detectable marker may have characteristic magnetic properties. For example, the marking agent may be a metal-containing marking agent that may itself have magnetic properties. Alternatively, the metal-containing marking agent may react, for example, upon exposure to elevated temperatures and/or to a reducing atmosphere (e.g. encountered during sintering), to provide characteristic magnetic properties. When such marking agents are incorporated into the 3D printed object (e.g. metal part) in a predetermined arrangement, the predetermined arrangement may form a detectable marker characterised by magnetic properties that differ from the magnetic properties of adjacent regions of the 3D printed object. This marker may be revealed when the magnetic properties of the 3D printed object (e.g. metal part) are analyzed. Where the marker is incorporated in a predetermined location in the 3D printed object, it may be possible to detect for magnetism at that predetermined location. The predetermined arrangement of the metal-containing marking agent may provide a magnetic signature, which may encode information relating to the 3D printed object, for example, information regarding the object's identity and/or purpose. In some examples, the magnetic signature may also encode information relating to subsequent processing operations relating to the 3D printed object.

In some examples, the detectable marker has characteristic mechanical properties (e.g. hardness). For instance, the marking agent may itself have mechanical properties (e.g. hardness). Alternatively, the marking agent may react, for example, upon exposure to elevated temperatures upon exposure to elevated temperatures and/or to a reducing atmosphere (e.g. encountered during sintering), to provide characteristic mechanical properties (e.g. hardness). When such marking agents are incorporated into the 3D printed object in a predetermined arrangement, the predetermined arrangement may form a detectable marker that is characterised by mechanical properties (e.g. hardness) that differ from the mechanical properties (e.g. hardness) of adjacent regions of the 3D printed object. This marker may be revealed when the mechanical properties (e.g. hardness) of the metal part are tested. Where the marker is incorporated in a predetermined location in the 3D printed object, it may be possible to detect for mechanical properties (hardness) at that predetermined location. The predetermined arrangement of the marking agent may provide a signature defined by e.g. regions or pattern within the part having characteristic mechanical properties (hardness, for example, higher or lower hardness), which may encode information relating to the 3D printed object, for example, information regarding the part's identity and/or purpose. In some examples, the encoded information may relate to subsequent processing operations relating to the 3D printed object.

In some examples, the detectable marker may have a characteristic response to treatment with a chemical agent, for instance, an etching agent (e.g. an acid). For example, the marking agent may form an alloy or composite with the at least one metal of the build material upon sintering. Such an alloy or composite may have a chemical resistance that is different from the chemical resistance of adjacent regions of the printed part. In some examples, such an alloy or composite may have a chemical resistance e.g. to etching that is greater than the chemical resistance of adjacent regions of the printed part. This marker may be revealed when the metal part is treated with a chemical agent, for example, an etching agent. The predetermined arrangement of the marking agent may provide a signature defined by e.g. regions or pattern within the part that erode to a different (e.g. greater or lesser) extent than the remainder of the part when the part is treated with a chemical agent e.g. an etching agent. As a result, a pattern may be revealed when the part is treated with a chemical agent, e.g. an etching agent. This pattern, once revealed, may be visible to the naked eye. This pattern may encode information on the part, for example, information regarding the part's identity and/or purpose. In some examples, the encoded information may relate to subsequent processing operations relating to the 3D printed object.

In some examples, the chemical agent may be an oxidizing agent. For instance, the oxidizing agent may be air or oxygen. Where the marking agent forms an alloy or composite with the at least one metal of the build material upon sintering, such an alloy or composite may have a resistance to oxidation that is different from the resistance to oxidation of adjacent regions of the printed part. Accordingly, the marker may be revealed when the metal part is oxidized, for example, on exposure to air over time or on exposure to oxygen at an elevated temperature. The predetermined arrangement of the marking agent may provide a signature defined by e.g. regions or pattern within the part that oxidize to a different (e.g. greater or lesser) extent than the remainder of the part when the part is oxidized. As a result, a pattern may be revealed when the part is oxidized. This pattern, once revealed, may be visible to the naked eye. This pattern may encode information on the part, for example, information regarding the part's identity and/or purpose. In some examples, the encoded information may relate to subsequent processing operations relating to the 3D printed object.

The present disclosure may also relate to a multi-fluid inkjet kit for 3D printing. The kit comprises a marking agent or inkjet ink composition comprising a marking component dispersed in a liquid carrier. The marking component comprises a first metal, carbon and/or a ceramic. The kit also comprises a binding agent or inkjet ink composition comprising a binder dispersed in a liquid carrier. The binder comprises a second metal or ceramic. Where the marking component comprises a first metal and the build material comprises a second metal, the second metal is different from the first metal.

In some examples, where the marking component comprises a first metal, the first metal is ferromagnetic. The ferromagnetic metal may be selected from at least one of: iron, cobalt and nickel.

In some examples, the kit further comprises a build material comprising at least one metal.

The first metal of the marking component may be alloyable with the second metal of the build material. In other words, the first metal may be capable of forming an alloy with the metal of the build material. An alloy may be formed, for example, on exposure to heat. In some examples, an alloy may be formed, for example, during sintering.

The alloy may have different mechanical properties from e.g. the metal of the build material. For example, the alloy may have a different hardness or response to a chemical agent (e.g. an etching agent). In some examples, the build material comprises copper. The first metal may be silver. The copper may form an alloy with the silver and the resulting silver-copper alloy may have different mechanical properties from copper. For example, the alloy may have a different hardness or response to a chemical agent (e.g. an etching agent).

In some examples, the at least one metal of the build material is the same as the metal of the binder (i.e. the second metal). For example, where the build material comprises copper, the binder may also comprise copper.

In some examples, the binder comprises a salt of the second metal.

Build Material

The build material employed in the present disclosure may comprise at least one metal or ceramic. In some examples, the build material employed in the present disclosure comprises at least one metal (i.e. metallic build material). The build material may comprise particles of build material. For example, the build material may comprise a build material powder.

In an example, the build material is a single phase metallic material composed of one element.

In another example, the build material is composed of two or more elements, which may be in the form of a single phase metallic alloy or a multiple phase metallic alloy. For some single phase metallic alloys, melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the metallic build material is composed of two or more phases (e.g., a multi-phase alloy made of two or more elements), melting generally begins when the eutectic or peritectic temperature is exceeded. The eutectic temperature is defined by the temperature at which a single phase liquid completely solidifies into a two phase solid. Generally, melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is known as super solidus sintering, and this technique may be useful when utilizing larger build material particles and/or to achieve high density. It is to be understood that the sintering temperature may be high enough to offer sufficient energy to allow atom mobility between adjacent particles.

Single elements or alloys may be used as the metallic build material. Some examples of the metallic build material include steels, stainless steel, bronzes, brasses, titanium (Ti) and alloys thereof, aluminum (Al) and alloys thereof, nickel (Ni) and alloys thereof, cobalt (Co) and alloys thereof, iron (Fe) and alloys thereof, gold (Au) and alloys thereof, silver (Ag) and alloys thereof, platinum (Pt) and alloys thereof, and copper (Cu) and alloys thereof. Some specific examples include AISM OMg, 2xxx series aluminum, 4xxx series aluminum, CoCr MPI, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V EL7. While several example alloys have been described, it is to be understood that other alloy build materials may be used, such as refractory metals.

Where the build material is ceramic, the ceramic may be nonmetallic, inorganic compounds, such as metal oxides, inorganic glasses, carbides, nitrides, and borides. Some specific examples include alumina ($Al_2O_3$), $Na_2O/CaO/SiO_2$glass (soda-lime glass), silicon carbide (SiC), silicon nitride ($Si_3N_4$), silicon dioxide ($SiO_2$), zirconia ($ZrO_2$), yttrium oxide-stabilized zirconia (YTZ), titanium dioxide ($TiO_2$), or combinations thereof. In an example, the build material powder may be a cermet (a metal-ceramic composite).

The build material may be made up of similarly sized particles or differently sized particles. In some examples, the build material has an average particle size of from about 5 to about 20 microns.

The term "size", as used herein with regard to the metallic build material 16, refers to the diameter of a particle, for example, a substantially spherical particle (i.e., a spherical or near-spherical particle having a sphericity of >0.84), or the average diameter of a non-spherical particle (i.e., the average of multiple diameters across the particle).

In some examples, particles of a particle size of from about 5 microns to about 20 microns have good flowability and can be spread relatively easily. As an example, the average particle size of the particles of the metallic build material may range from about 1 microns to about 200 microns. As another example, the average size of the particles of the metallic build material ranges from about 10 microns to about 100 microns. As still another example, the average size of the particles of the metallic build material ranges from 15 microns to about 50 microns.

Marking Agent

The marking agent may comprise a marking component in a liquid carrier. The marking component may be present in amounts of about 0.2 to about volume % of the marking agent (inkjet ink composition). In some examples, the marking component may be present in amounts of about 2 to about 8 volume %, for instance, about 4 to about 5 volume % of the marking agent. The marking agent is an inkjet ink composition.

The marking component may comprise carbon, ceramic or metal. The marking component may comprise marker nanoparticles dispersed in a liquid carrier. Alternatively, the marking component may be dissolved in a liquid carrier. For instance, the marking component may comprise a metal salt dissolved in a liquid carrier.

In some examples, the marking component comprises marker nanoparticles dispersed in a liquid carrier. The marker nanoparticles may be formed of carbon, ceramic and/or metal.

The marking component (e.g. marker nanoparticles) may be employed to impart distinctive properties to selected regions of the 3D printed object. These distinctive properties allow a detectable marker to be incorporated in the 3D printed object. For example, the marking component (e.g. marker nanoparticles) may comprise a metal that alloys with the metal of the build material. The alloy may have properties that are distinguishable from the properties of the build material. Alternatively, the marking component comprises marker nanoparticles that comprise carbon, which can be used to alter the carbon content of build material comprising iron (e.g. steel). In some examples, the marking component comprises marker nanoparticles that comprise ceramic fillers that can be used to form a reinforced composite material from the build material.

Where the marking component (e.g. marker nanoparticles) comprise metal, the metal may be a metal alloy and/or metal compound. When a metal is present in the marking agent, the metal in the marking agent may be different from a metal in the build material. In one example, the marking agent may include a metal that is different from the metal in the build material and any metal in the binder. In other words, the binder may include a second metal that is different from the first metal of the marking agent. As described below, the metal in the binder (where present) may be the same as the metal of the build material at least in the locality of the detectable marker.

The marking agent may include marker nanoparticles with dimensions that are in the nanometer size range, that is, from about 1 nanometer to about 1,000 nanometers. In an example, the nanoparticles may be in a size range of about 1 nanometers to about 100 nanometers, and for example within a range of about 1 to about 50 nanometers. The nanoparticles may have any shape.

Suitable marker nanoparticles for the marking agent include nanoparticles formed from: AlN, SiC, $Si_3N_4$, WC, $Al_2O_3$, $Al(OH)_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, nickel oxide (e.g. NiO), cobalt oxide (e.g. CoO, $Co_3O_4$), carbon, magnesium, manganese, aluminum, iron, titanium, niobium, tungsten, chromium, tantalum, cobalt, nickel, vanadium, zirconium, molybdenum, palladium, platinum, copper, silver, gold, cadmium, zinc, tin, silicon, lead, boron, and combinations of these with each other and/or with a non-metallic element or elements.

Where the marking component comprises a metal salt, suitable metal salts include salts of copper, silver iron, nickel, manganese or cobalt. In some examples, the metal salt may be a salt of copper. Examples of salts include nitrates, sulfates, formates, and acetates. Suitable salts may be selected from the group consisting of copper nitrate, iron nitrate, nickel nitrate, manganese nitrate, cobalt nitrate, iron acetate, and combinations thereof. In one example, the metal salt is copper nitrate. The metal salt may be hydrated.

The marking agent employed in the present disclosure is a marking agent that can be incorporated into the 3D printed object (also referred to as a "printed part") in a predetermined arrangement. As discussed above, the predetermined arrangement forms a detectable marker. In some examples, the detectable marker may not be detectable by visual inspection. This can allow covert marking of the printed substrate.

In some examples, the detectable marker is invisible. For example, the detectable marker may have characteristic magnetic properties. In some examples, the marking component (e.g. marker nanoparticles) may comprise a first metal that is magnetic. The metal may be present in any form, for example, as a pure metal, an alloy and/or a metal compound (e.g. metal oxide). Examples of such magnetic metals include ferromagnetic metals, for instance, iron, nickel and cobalt. In one example, the marking component (e.g. marker nanoparticles) comprises iron. The iron can be incorporated into the printed part in a predetermined arrangement to provide a characteristic magnetic arrangement (e.g. magnetic signature) within the part. This magnetic arrangement (e.g. magnetic signature) can encode information regarding e.g. the identity and/or purpose of the part, allowing the part to be tracked and traced. Since the magnetic arrangement (e.g. magnetic signature) is invisible, it may be possible to track and trace the part covertly. For example, if the signature is applied at a predetermined location within the part, the magnetism of the part can be tested at least at the predetermined location to e.g. identify or obtain information on the part. The magnetic arrangement (e.g. magnetic signature) may be located at a predetermined location in the part e.g. within the body of the part or at least partly on the surface of the part. The magnetic materials may be incorporated into predetermined locations of the part as an alloy or composite with the build material.

In some examples, the marker nanoparticles may contain metal (e.g. magnetic metal), but may not themselves be magnetic. For example, the marker nanoparticles may contain the metal in the form of a metal compound (e.g. a metal oxide). However, upon exposure to elevated temperatures and/or to a reducing atmosphere, magnetic materials may be formed. Examples of such magnetic materials include ferromagnetic metals, for instance, iron, nickel and cobalt. In one example, the magnetic material is iron. The magnetic materials formed may be incorporated into predetermined locations of the part as an alloy or composite with the build material e.g. during the sintering process.

In one example, marker nanoparticles comprising iron oxide may be used in the marking agent. When such particles are incorporated into the printed part and the part is exposed to elevated temperatures and/or a reducing atmosphere (e.g. sintering), the iron oxide may be reduced to iron. This can leave a magnetic arrangement (e.g. magnetic signature) within the 3D printed object. This magnetic arrangement (e.g. magnetic signature) can encode information regarding e.g. the identity and/or purpose of the part, allowing the 3D printed object to be tracked and traced. Since the magnetic arrangement (e.g. magnetic signature) is invisible, it may be possible to track and trace the 3D printed object covertly, for example, if the signature is applied at a predetermined location within the 3D printed object.

Inks that are suitable for incorporating magnetic arrangements (e.g. magnetic signatures) into the part include magnetic ink character recognition (MICR) inks, i.e. inks used for printing magnetic ink character recognition (MICR) codes. Such magnetic ink character recognition (MICR) inks may include iron oxide (e.g. $Fe_3O_4$) nanoparticles.

The detectable marker may have characteristic mechanical properties. properties. For example, the detectable marker may have characteristic hardness properties. Such hardness properties may be determined using a hardness tester (e.g. Rockwell hardness, ASTM E-18-19).

In some examples, the marker nanoparticles may have characteristic mechanical properties that are readily distinguishable from those of the build material (e.g. when the build material is sintered under the same conditions). In other examples, on exposure to elevated temperatures and/or a reducing atmosphere (e.g. during sintering), materials with characteristic mechanical properties may be formed. These materials may be incorporated into predetermined locations of the part as an alloy or composite with the build material. It is this alloy or composite that may form the detectable marker e.g. with the characteristic hardness properties.

In one example, the marking agent comprises a metal compound, e.g. iron oxide nanoparticles. The metal compound, e.g. iron or other metal oxide, may be incorporated into the printed part to form a composite materials in a predetermined arrangement within the part. On exposure to elevated temperatures and/or a reducing atmosphere e.g. during sintering, at least some of the metal compound converted to metal. In the case of iron or another metal oxide, the iron or other metal may be reduced. The iron or other metal may form an alloy or composite with the metal of the build material in a predetermined arrangement within the 3D printed object. The mechanical properties where the composite or alloy is present will be different from the mechanical properties in adjacent regions of the 3D printed object, providing the object with a predetermined hardness arrangement (e.g. a hardness signature) defined by characteristic mechanical properties. This predetermined hardness arrangement (e.g. hardness signature) can encode information regarding e.g. the identity and/or purpose of the 3D printed object, allowing the 3D printed object to be tracked and traced. Where the predetermined hardness arrangement (e.g. hardness signature) is invisible from the exterior of the part, it may be possible to track and trace the 3D printed object covertly, for example, if the hardness arrangement (e.g. hardness signature) is applied at a predetermined location within the 3D printed object.

Other examples of materials that can be included in the marking agent to form an alloy or composite with the build material include carbon, nickel, copper, oxygen, chromium, boron cobalt, silicon, nitrogen, titanium, molybdenum, manganese, aluminium, cerium, niobium, tungsten, magnesium, zinc, tin, lead, zirconium and vanadium. For example, where the build material comprises steel, the marking agent may comprise carbon to produce a higher carbon steel alloy at selected, predetermined locations. This higher carbon steel alloy forms a predetermined hardness arrangement that can act as a hardness signature in the 3D printed object.

The detectable marker may have a characteristic response to a chemical agent. In some examples, the detectable marker may have a lesser resistance to a chemical agent. In other examples, the detectable marker may have a greater resistance to a chemical agent. The chemical agent may be an etching agent, for example, an acid. In one example, the detectable marker may have a characteristic response to an etching agent, such that the detectable marker is more resistant to etching than areas of the 3D printed object where the detectable marker is absent. Accordingly, when the part is treated with a chemical (e.g. etching) agent at least at a relevant location, the detectable marker may be revealed as areas surrounding the marker may be etched away. In another example, the chemical agent may be an oxidizing agent, for instance, air. In one example, the detectable marker may have a characteristic response to exposure to air or other oxidizing environment (e.g. at an elevated temperature), such that the detectable marker is more resistant to such exposure than areas of the 3D printed object where the detectable marker is absent. Accordingly, when the part is exposed to air or other oxidizing environment (e.g. at elevated temperatures) at least at a relevant location, the detectable marker may be revealed as areas surrounding the marker may be more readily oxidized.

In some examples, the marker nanoparticles may have characteristic response to a chemical agent that is readily distinguishable from that of the build material. In other examples, on exposure to elevated temperatures and/or a reducing atmosphere e.g. during sintering, a material with a characteristic response to the chemical agent may be formed. Examples of materials include silver, copper, chromium, manganese, nickel, molybdenum, vanadium, silicon, boron, aluminium, cobalt, cerium, niobium, tungsten, tin, zinc, lead and zirconium. These materials may be incorporated into predetermined locations of the part as an alloy or composite with the build material e.g. during the sintering process.

In one example, where the marking agent comprises silver nanoparticles, the silver nanoparticles may be incorporated into the printed part to form a composite materials in a predetermined arrangement within the part. On exposure to elevated temperatures e.g. during sintering, the silver forms an alloy with the metal (e.g. copper) of the build material in a predetermined arrangement within the part. The chemical resistance (e.g. to etching) where the composite or alloy is present will be different from the mechanical properties in adjacent regions of the part. This may provide the 3D printed object with a distinctive arrangement (e.g. signature) that can be revealed by treatment with a chemical agent (e.g. etching agent) in a relevant location on the part. This signature can encode information regarding e.g. the identity and/or purpose of 3D printed object part, allowing the 3D printed object to be tracked and traced. The signature can also encode data relating to subsequent processing steps, e.g. by delineating sections of the part to which other portions are to be attached.

In some examples, the marking agent comprises a metal. In some examples, the metal may be magnetic, or may be a metal that is alloyable with a metal present in the build material.

The marking agent may be a liquid composition comprising nanoparticles and a liquid carrier. The marking agent may be a jettable composition, i.e. an inkjet ink composition. Suitable liquid carriers include water or a non-aqueous solvent (e.g. ethanol, acetone, n-methyl pyrrolidone, aliphatic hydrocarbons or combinations thereof).

In some examples, the marking agent may further comprise at least one of: a co-solvent, a surfactant, a dispersant, a biocide, an anti-kogation agent, viscosity modifiers, buffers, stabilizers, and combinations thereof. The presence of a co-solvent, a surfactant, and/or a dispersant in the agent may assist in obtaining a particular wetting behaviour when the marking agent is applied to the build material.

Examples of co-solvents that may be used include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Other examples of some suitable co-solvents include water-soluble high-boiling point solvents (i.e., humectants), which have a boiling point of at least about 120° C., or higher. Some examples of high-boiling point solvents include 2-pyrrolidone (boiling point of about 245° C.), 2-methyl-1,3-propanediol (boiling point of about 212° C.), and combinations thereof.

The co-solvent(s) may be present in the marking agent in a total amount ranging from about 1 wt % to about 70 wt % based upon the total weight of the marking agent, depending upon the jetting architecture of the applicator.

Surfactant(s) may be used to improve the wetting properties and the jettability of the marking agent. In some examples, the surfactant can be Dowfax™ 2A1. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL®440 or SURFYNOL® CT-1 1 1 from Air Products and Chemical Inc.) or an ethoxylated wetting agent and molecular defoamer (e.g., SURFYNOL®420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 or TERGITOL™ 15-S-7 from The Dow Chemical Company). In some examples, it may be useful to utilize a surfactant having a hydrophilic-lipophilic balance (HLB) less than 10.

Whether a single surfactant is used or a combination of surfactants is used, the total amount of surfactant(s) in the marking agent may range from about 0.01 wt % to about 10 wt % based on the total weight of the marking agent. In another example, the total amount of surfactant(s) in the marking agent may range from about 0.5 wt % to about 2.5 wt % based on the total weight of the marking agent.

The marking agent may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® M20 (Thor), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., Bardac®2250 and 2280, Barquat® 50-65B, and Carboquat® 250-T, all from Lonza Ltd. Corp.), and an aqueous solution of methylisothiazolone (e.g., Kordek® MLX from Dow Chemical Co.). The biocide or antimicrobial may be added in any amount ranging from about 0.05 wt % to about 0.5 wt % (as indicated by regulatory usage levels) with respect to the total weight of the marking agent.

An anti-kogation agent may be included in the marking agent. Kogation refers to the deposit of dried ink (e.g. binding agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ 03A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the marking agent may range from greater than 0.20 wt % to about 0.62 wt % based on the total weight of the marking agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents, such as EDTA (ethylene diamine tetra acetic acid), may be included to eliminate the deleterious effects of heavy metal impurities, and buffer solutions may be used to control the pH of the binding agent. From 0.01 wt % to 2 wt % of each of these components, for example, can be used. Viscosity modifiers and buffers may also be present, as well as other known additives to modify properties of the binding agent. Such additives can be present in amounts ranging from about 0.01 wt % to about 20 wt %.

For the avoidance of doubt, the marking agent may be used to form a detectable marker in the 3D printed object at a particular location. However, at a different location on the 3D printed object, the nanoparticles employed in the marking agent may be employed for a different purpose (e.g. to reinforce the mechanical properties at specific locations in the part for purposes other than marking). The marking agent may also have binding properties. However, in some examples, the marking component of the marking agent is different from the binder in the binding agent.

Binding Agent

Any suitable binding agent may be used. In some examples, the binding agent may be a liquid composition comprising a binder in a liquid carrier. The binder may include a metal (e.g. the second metal in a kit according to the present disclosure). For example, the binder may be a metal salt (e.g. hydrated metal salt) dispersed or dissolved in a liquid carrier. Other examples of binders include polymer binders.

In some examples, a metal salt may be employed as the binder. The metal salt may be a hydrated metal salt. The metal of the metal salt may be the same or different from the metal of the build material. The metal of the metal salt may be the same as the metal of the build material. In some examples, the metal of the metal salt may be the same as the metal of the build material at least in the region where the detectable marker is located.

The metal salt may be a salt of copper, silver iron, nickel, manganese or cobalt. In some examples, the metal salt may be a salt of copper. Examples of salts include nitrates, sulfates, formates, and acetates.

Where a hydrated metal salt is employed, the hydrated metal salt can be selected from the group consisting of hydrated copper nitrate, hydrated iron nitrate, hydrated nickel nitrate, hydrated manganese nitrate, hydrated cobalt nitrate, hydrated iron acetate, and combinations thereof.

In one example, the hydrated metal salt is copper nitrate.

In some examples, the at least one hydrated metal salt is present in the binding agent in an amount of from about 5 wt % to about 50 wt % based on the total weight of the binding agent, or from about 10 wt % to about 50 wt % based on the total weight of the binding agent, or from about 15 wt % to about 50 wt % based on the total weight of the binding agent, or from about 20 wt % to about 50 wt % based on the total weight of the binding agent, or from about 25 wt % to about 50 wt % based on the total weight of the binding agent, or from about 30 wt % to about 50 wt % based on the total weight of the binding agent, or from about 35 wt % to about 50 wt % based on the total weight of the binding agent, or from about 40 wt % to about 50 wt % based on the total weight of the binding agent, or from about 45 wt % to about 50 wt % based on the total weight of the binding agent, or less than about 50 wt % based on the total weight of the binding agent, or less than about 45 wt % based on the total weight of the binding agent, or less than about 40 wt % based on the total weight of the binding agent, or less than about 35 wt % based on the total weight of the binding agent, or less than about 30 wt % based on the total weight of the binding agent, or less than about 25 wt % based on the total weight of the binding agent, or less than about 20 wt % based on the total weight of the binding agent, or less than about 15 wt % based on the total weight of the binding agent, or less than about 10 wt % based on the total weight of the binding agent.

Other examples of binders include polymer binders and binders comprising sugars polycarboxylic acids, polysulfonic acids, and polyether alkoxy silanes.

Where a polymer binder is employed, the polymer binder may be a semi-crystalline polymer, such as polypropylene and polyethylene. The polymer binder may be a non-crystalline polymer, such as polyethylene oxide, polyethylene glycol (solid), acrylonitrile butadiene styrene, polystyrene, styrene-acrylonitrile resin, and polyphenyl ether. The polymer binder may be selected from the group consisting of polypropylene, polyethylene, low density polyethylene, high density polyethylene, polyethylene oxide, polyethylene glycol, acrylonitrile butadiene styrene, polystyrene, styrene-acrylonitrile resin, polyphenyl ether, polyamide 1 1, polyamide 12, polymethyl pentene, polyacrylate, polymethyl methacrylate, polyoxymethylene, polyethylene terephthalate, polybutylene terephthalate, polyvinylidene fluoride, polytetrafluoroethylene, perfluoroalkoxy alkane, polyphenylene sulfide, and polyether ether ketone.

The polymer binder may have a melting point temperature less than about 250° C., for example it may range from about 50° C. to about 249° C., for example from about 60° C. to about 240° C., and as a further example from about 70° C. to about 235° C.

The polymer binder may be present in the binding agent in an amount ranging from about 1% to about 6% by volume, for example from about 2% to about 5%, and as a further example from about 3% to about 5% by volume. In another aspect, the polymer binder may be present in the binding agent in an amount up to 100% by volume loading, for example, if using a piezo ink jet to jet the polymer precursor materials.

In some examples, the binder comprises sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6Hi_20_6$), sucrose (C12H22O11), fructose ($C_6H_{12}0_6$), maltodextrines with a chain length ranging from 2 units to 20 units, sorbitol ($C_6H_{14}0_6$), erythritol ($C_4H_{10}O_4$), mannitol ($C_6H_{14}0_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used; however the dissolution kinetics may be slower.

As mentioned above, the binding agent can include the binder and the liquid carrier. As used herein, "liquid carrier" may refer to the liquid in which the binder is dispersed to form the binding agent. A wide variety of liquid carriers, including aqueous and non-aqueous vehicles, may be used in the binding agent. In some instances, the liquid carrier consists of a primary solvent with no other components. In other examples, the binding agent may include other ingredients, depending, in part, upon the applicator that is to be used to dispense the binding agent.

In some examples, the binding agent can include a coalescing solvent. In these examples, the coalescing solvent may dissolve and disperse the binder. For example, where a polymer binder is used, the binding agent may include a coalescing solvent.

In some examples, the coalescing solvent may be a lactone, such as 2-pyrrolidinone or 1-(2-hydr oxyethyl)-2-pyrrolidone. In other examples, the coalescing solvent may be a glycol ether or a glycol ether esters, such as tripropylene glycol mono methyl ether, dipropylene glycol mono methyl ether, dipropylene glycol mono propyl ether, tipropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, or combinations thereof. In still other examples, the coalescing solvent may be a water-soluble polyhydric alcohol, such as 2-methyl-1,3-propanediol. In still other examples, the coalescing solvent may be a combination of any of the examples above. In still other examples, the coalescing solvent is selected from the group consisting of 2-pyrrolidinone, 1-(2-hydroxyethyl)-2-pyrrolidone, tri-propylene glycol mono methyl ether, dipropylene glycol mono methyl ether, dipropylene glycol mono propyl ether, tri-propylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof.

The coalescing solvent may be present in the binding agent in an amount ranging from about 0.1 wt % to about 70 wt % (based upon the total weight of the binding agent). In some examples, greater or lesser amounts of the coalescing solvent may be used depending, in part, upon the jetting architecture of the applicator.

Examples of other suitable optional binding agent components include co-solvents), surfactant(s), antimicrobial agent(s), anti-kogation agent(s), viscosity modifier(s), pH adjuster(s) and/or sequestering agent(s). The presence of a co-solvent and/or a surfactant in the binding agent may assist in obtaining a particular wetting behavior with the metallic build material.

The primary solvent may be water or a non-aqueous solvent (e.g., ethanol, acetone, n-methyl pyrrolidone, aliphatic hydrocarbons, or combinations thereof). In some examples, the binding agent consists of the hydrated metal salt and the primary solvent (with no other components). In these examples, the primary solvent makes up the balance of the binding agent.

Classes of organic co-solvents that may be used in the water-based binding agent include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include water-soluble high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point of about 212° C.), and combinations thereof. The co-solvent(s) may be present in the binding agent in a total amount ranging from about 1 wt % to about 70 wt % based upon the total weight of the binding agent, depending upon the jetting architecture of the applicator.

Surfactant(s) may be used to improve the wetting properties and the jettability of the binding agent. In some examples, the surfactant can be Dowfax™ 2A1. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL®440 or SURFYNOL® CT-1 1 1 from Air Products and Chemical Inc.) or an ethoxylated wetting agent and molecular defoamer (e.g., SURFYNOL®420 from Air Products and Chemical Inc.). Still other suitable surfactants include non-ionic wetting agents and molecular defoamers (e.g., SURFYNOL®104E from Air Products and Chemical Inc.) or water-soluble, non-ionic surfactants (e.g., TERGITOL™ TMN-6 or TERGITOLT™ 15-S-7 from The Dow Chemical Company). In some examples, it may be useful to utilize a surfactant having a hydrophilic-lipophilic balance (HLB) less than 10.

Whether a single surfactant is used or a combination of surfactants is used, the total amount of surfactant(s) in the binding agent may range from about 0.01 wt % to about 10 wt % based on the total weight of the binding agent. In another example, the total amount of surfactant(s) in the binding agent may range from about 0.5 wt % to about 2.5 wt % based on the total weight of the binding agent.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® M20 (Thor), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., Bardac®2250 and 2280, Barquat® 50-65B, and Carboquat® 250-T, all from Lonza Ltd. Corp.), and an aqueous solution of methylisothiazolone (e.g., Kordek® MLX from Dow Chemical Co.). The biocide or antimicrobial may be added in any amount ranging from about 0.05 wt % to about 0.5 wt % (as indicated by regulatory usage levels) with respect to the total weight of the binding agent.

An anti-kogation agent may be included in the binding agent. Kogation refers to the deposit of dried ink (e.g.

binding agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ 03A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the binding agent may range from greater than 0.20 wt % to about 0.62 wt % based on the total weight of the binding agent 36. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents, such as EDTA (ethylene diamine tetra acetic acid), may be included to eliminate the deleterious effects of heavy metal impurities, and buffer solutions may be used to control the pH of the binding agent. From 0.01 wt % to 2 wt % of each of these components, for example, can be used. Viscosity modifiers and buffers may also be present, as well as other known additives to modify properties of the binding agent. Such additives can be present in amounts ranging from about 0.01 wt % to about 20 wt %.

For the avoidance of doubt, the binding agent may be jetted onto portions of the build material where the marking agent is absent. For example, the binding agent may be jetted onto the build material to delineate or surround the region(s) where marking agent is applied. Alternatively, the binding agent may also be jetted onto at least portions of the build material where the marking agent is present. Thus, the predetermined arrangement that forms the detectable marker may be formed by the marking agent as well as the binding agent.

3D Printing

As described above, the present disclosure relates to a method of three-dimensional (3D) printing a metal part. The method comprises selectively jetting a marking agent onto a first region of build material. The method also comprises selectively jetting a binding agent onto at least a portion of the build material, and binding the build material to form a layer, such that the marking agent is incorporated in the metal part in a predetermined arrangement that forms a detectable marker in the part.

In 3D printing, a layer of build material may be applied to a print platform. A binding agent may then be selectively jetted onto at least a portion of the layer of build material. A further layer of build material may then be applied, and a binding agent may then be selectively jetted onto a portion of the newly applied layer. The process may be repeated one or more times.

By selectively jetting the binding agent onto the build material, the build material becomes patterned. The patterned build material may then be bound to form a layer. Binding may be carried out e.g. by applying heat to the patterned build material. For example, heating may cause at least some of the liquid in the binding agent to evaporate. This evaporation may result in some densification, for example, through capillary action of the layer. Alternatively or additionally, heating may cause physical and/or chemical changes in the binder that cause the build material to be stabilised.

Binding may be performed after a single pass of the binding agent or after a few passes of binding agent have been applied. Alternatively or additionally, binding may be performed to a patterned 3D printed object to affect the binding of multiple layers.

In the present disclosure, a marking agent is also selectively jetted onto the build material. The marking agent may be selectively jetted at predetermined locations on predetermined layers of the build material. Accordingly, the marking agent can be incorporated into the metal part in a predetermined arrangement that forms a detectable marker in the metal part. As such, some layers of build material may not be patterned with the marking agent and other layers may only be patterned with marking agent at selected, predetermined locations. The selective application of the marking agent may be based on a model of the detectable marker to be incorporated into the 3D printed metal part. As mentioned above, such a model may comprise or be derived from a set of programming instructions defining for the detectable marker should be printed.

In some examples, a binding agent and a marking agent may be applied to a layer of build material. The binding agent and marking agent may be applied in distinct locations on the build material. In these examples, the marking agent may also have a binding function, so, as well as being useful for forming the predetermined marker, the marking agent may also bind the build material in the region where marking agent is applied. In some examples, the binding agent may be applied at a location adjacent to the location where the marking agent is applied. In some examples, the binding agent may be applied to delineate a region where marking agent is applied.

In some examples, some binding agent may be also be applied to the region where marking agent is applied. Where the marking agent cannot provide a binding function, the binding function may be provided by the binding agent. Alternatively or additionally, the binding agent may supplement any binding properties of the marking agent. In these examples, the predetermined arrangement that forms the detectable marker may be formed of the marking agent and the binding agent.

The procedure used to bind the build material may depend, for example, the nature of the build material, the binding agent and/or the marking agent. In some examples, binding may be performed by heating to a binding temperature of, for instance, about 80 to about 300 degrees C.

In some examples, the binding temperature may be from about 100° C. to about 280° C., or from about 100° C. to about 250° C., or from about 100° C. to about 240° C., or from about 100° C. to about 230°. In some examples, the binding temperature may be from about 130° C. to about 280° C., or from about 140° C. to about 250° C., or from about 150° C. to about 240° C., or from about 160° C. to about 230°.

In some examples, after binding, the build material (e.g. patterned with the binding agent and/or marking agent) may be sintered. Suitable sintering temperatures are from about 450° C. to about 1800° C., or from about 500° C. to about 1500° C., or from about 600° C. to about 1500° C., or from about 700° C. to about 1500° C., or from about 800° C. to about 1500° C., or from about 900° C. to about 1500° C., or from about 1000° C. to about 1500° C., or from about 1 100° C. to about 1500° C., or from about 1200° C. to about 1500° C., or from about 1300° C. to about 1500° C., or from about 1400° C. to about 1500° C.

In some examples, the heating of the three-dimensional object to the sintering temperature is performed for a sintering time period ranging from about 10 minutes to about 20 hours, or at least 10 minutes, or at least 1 hour, or at least 8 hours, or at least 10 hours, or at least 15 hours, or at least 20 hours.

Sintering may be performed in a reducing atmosphere, for example, in the presence of hydrogen. In some examples, sintering may be performed in the presence of hydrogen and an inert gas, for example, argon or under vacuum.

When the binder is heated, at least partial decomposition of the binder can occur. This decomposition may facilitate consolidation of the build material to form the 3D printed object. For example, where a polymer binder is employed, heating e.g. during sintering may cause polymer burn-out, such that the polymer binder is removed from the sintered product. Where a hydrated metal salt is employed as the binder, the hydrated metal salt can be dehydrated, then decomposed to a metal oxide and subsequently reduced to a metal. This stage-wise decomposition may occur on exposure to elevated temperatures, for example, during binding and/or sintering.

Figure 2A:
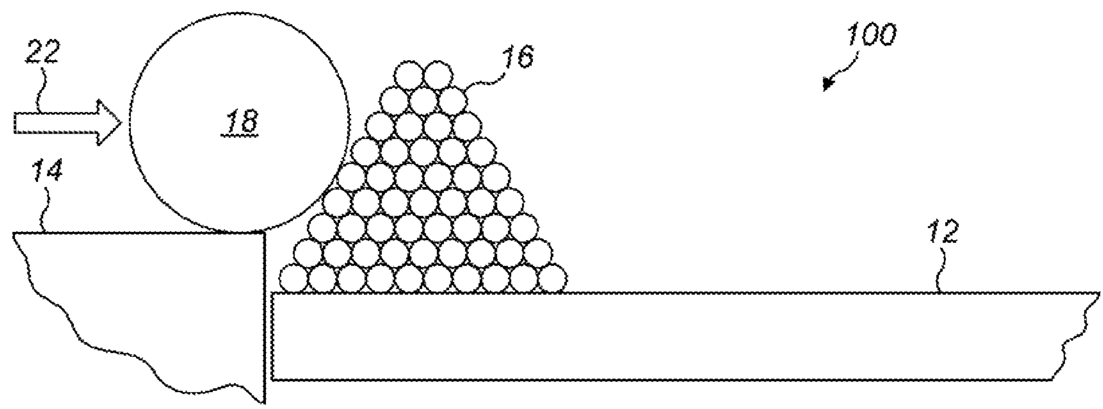
FIGS. 2A through 2F are schematic views depicting the formation of 3D printed part according to an example of the present disclosure.
Figure 2B:
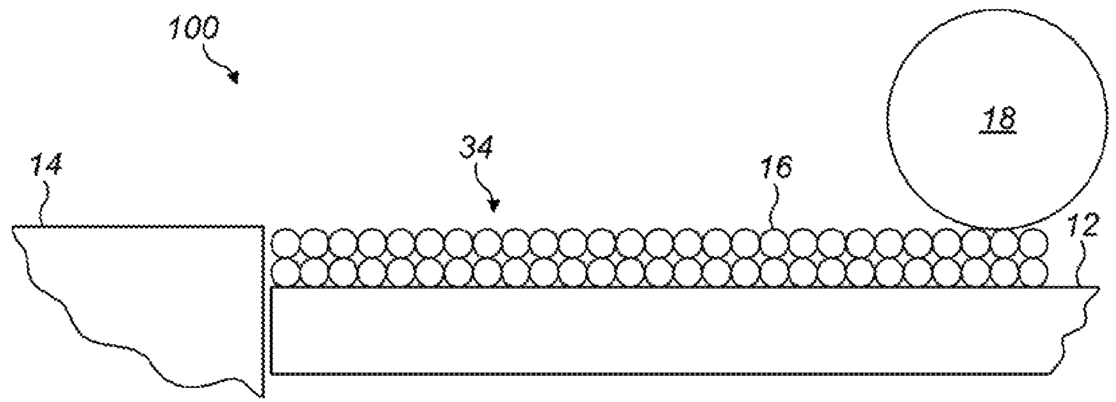
Figure 2C:
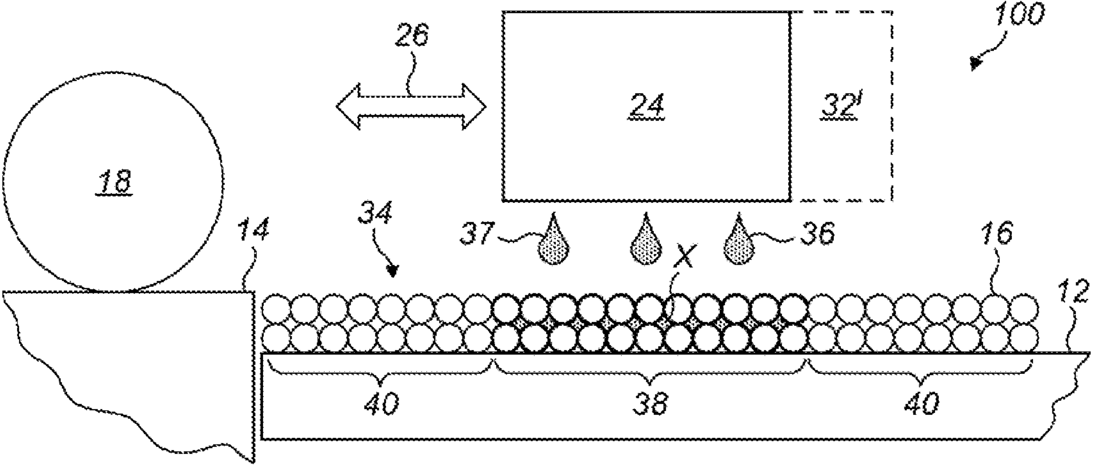
Figure 2D:
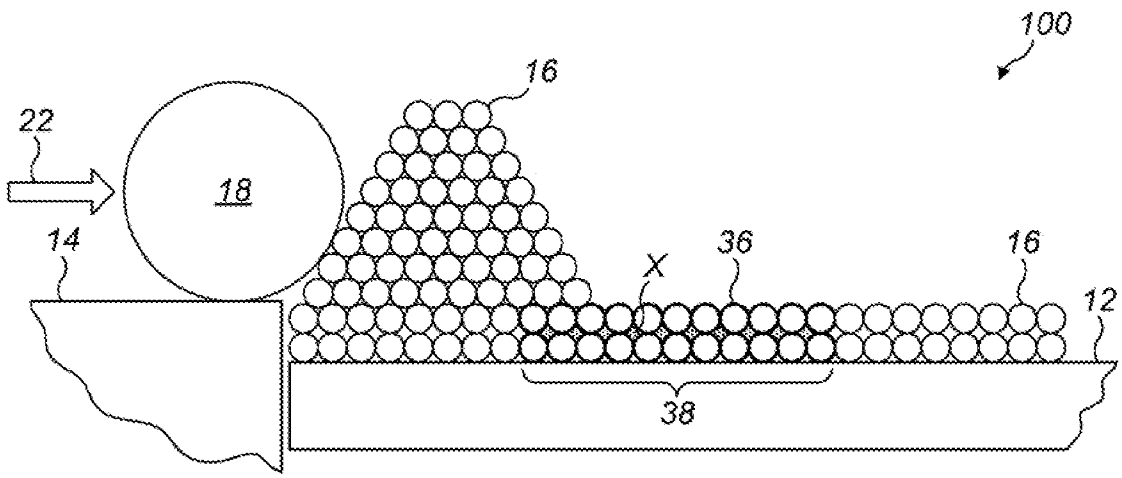
Figure 2E:
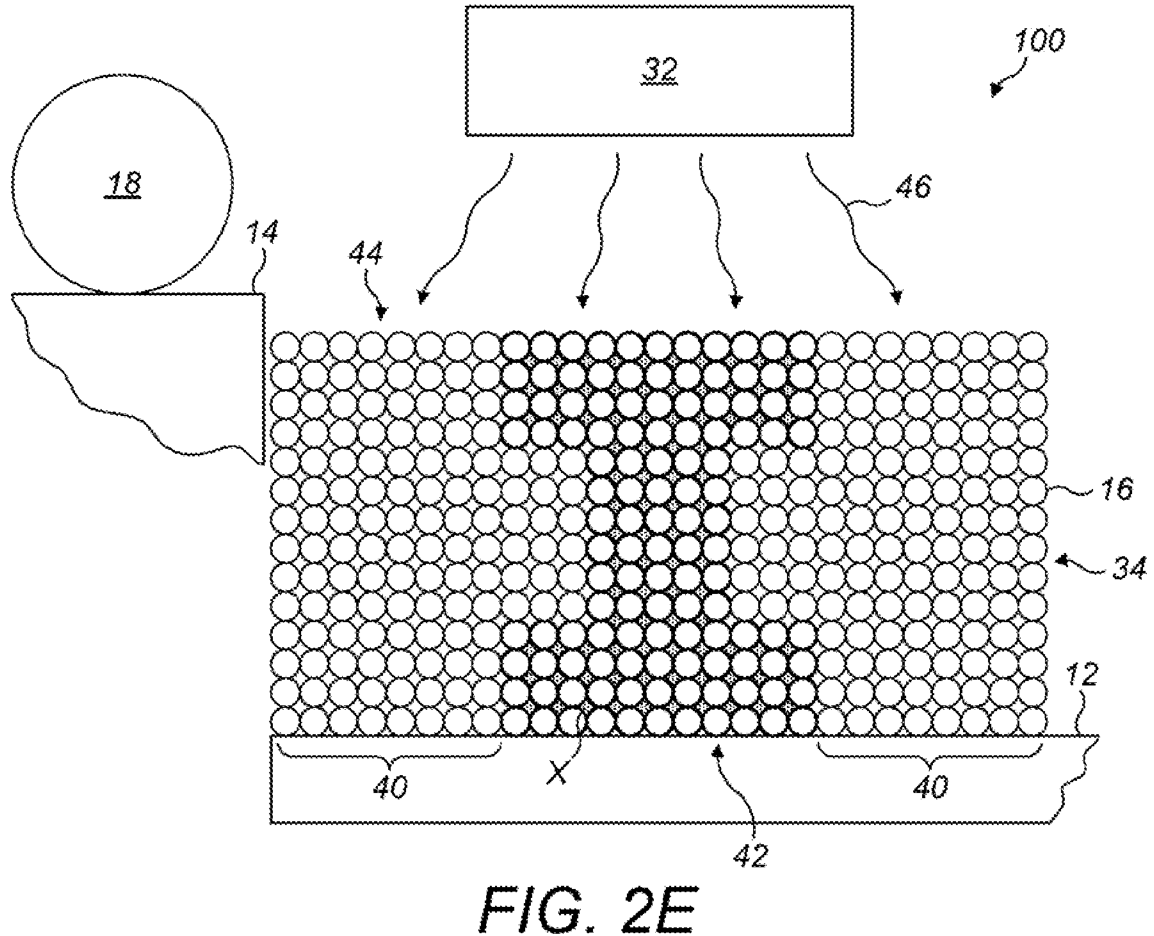
Figure 2F:
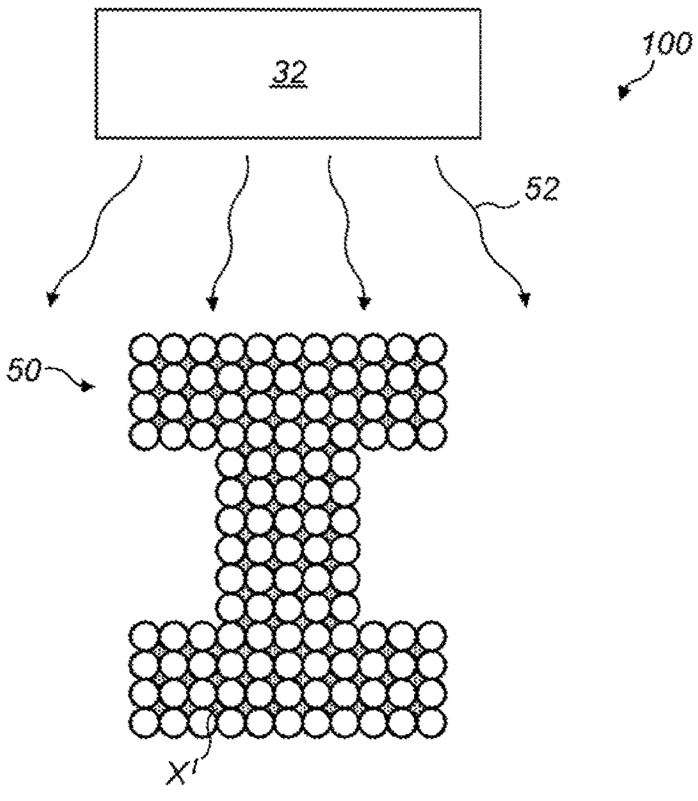

FIGS. 1 to 2F

As used herein, the term "patterned 3D printed object" refers to an intermediate part that has a shape representative of the final 3D printed part and that includes build material patterned with a binding agent and/or marking agent. In the patterned 3D printed object, the build material particles may or may not be weakly bound together by at least one component of the binding agent and/or marking agent, and/or by attractive force(s) between build material particles and the binding agent and/or marking agent. It is to be understood that any build material that is not patterned with the binding agent and/or marking agent is not considered to be part of the patterned 3D printed object, even if it is adjacent to or surrounds the patterned 3D printed object.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The three-dimensional (3D) printing system 10 may include a supply 14 of e.g. metallic build material 16; a build material distributor 18; a supply of a binding agent and a supply of a marking agent; an inkjet applicator 24 for selectively dispensing the binding agent or marking agent 36, 37 (see FIG. 2C); at least one heat source 32; a controller 28; and a non-transitory computer readable medium having stored thereon computer executable instructions to cause the controller 28 to: utilize the build material distributor 18 to iteratively form multiple layers 34 (FIG. 2B) of metallic build material 16, and the inkjet applicator 24 to selectively apply binding agent 36 and marking agent 37, thereby creating a patterned 3D printed object 42 (FIG. 2E), and utilize the at least one heat source 32 to heat 46 the patterned 3D printed object 42 to about a temperature to affect binding of the metallic build material particles 16 by creating a 3D printed object 42, and heat the 3D printed object 42 to a sintering temperature to form a sintered 3D printed object.

As shown in FIG. 1, the printing system 10 includes a build area platform 12, the build material supply 14 containing metallic build material particles 16, and the build material distributor 18.

The build area platform 12 receives the metallic build material 16 from the build material supply 14. The build area platform 12 may be integrated with the printing system 10 or may be a component that is separately insertable into the printing system 10. For example, the build area platform 12 may be a module that is available separately from the printing system 10. The build area platform 12 that is shown is also one example, and could be replaced with another support member, such as a platen, a fabrication/print bed, a glass plate, or another build surface.

The build area platform 12 may be moved in a direction as denoted by the arrow 20, e.g., along the z-axis, so that metallic build material 16 may be delivered to the platform 12 or to a previously formed layer of metallic build material 16 (see FIG. 2D). In an example, when the metallic build material particles 16 are to be delivered, the build area platform 12 may be programmed to advance (e.g., downward) enough so that the build material distributor 18 can push the metallic build material particles 16 onto the platform 12 to form a layer 34 of the metallic build material 16 thereon (see, e.g., FIGS. 2A and 2B). The build area platform 12 may also be returned to its original position, for example, when a new part is to be built.

The build material supply 14 may be a container, bed, or other surface that is to position the metallic build material particles 16 between the build material distributor 18 and the build area platform 12. In some examples, the build material supply 14 may include a surface upon which the metallic build material particles 16 may be supplied, for instance, from a build material source (not shown) located above the build material supply 14. Examples of the build material source may include a hopper, an auger conveyer, or the like.

Additionally, or alternatively, the build material supply 14 may include a mechanism (e.g., a delivery piston) to move the metallic build material particles 16 from a storage location to a position to be spread onto the build area platform 12 or onto a previously formed layer of metallic build material 16.

The build material distributor 18 may be moved in a direction as denoted by the arrow 22, e.g., along the y-axis, over the build material supply 14 and across the build area platform 12 to spread a layer of the metallic build material 16 over the build area platform 12. The build material distributor 18 may also be returned to a position adjacent to the build material supply 14 following the spreading of the metallic build material 16. The build material distributor 18 may be a blade (e.g., a doctor blade), a roller, a combination of a roller and a blade, and/or any other device capable of spreading the metallic build material particles 16 over the build area platform 12. For instance, the build material distributor 18 may be a counter-rotating roller.

The metallic build material 16 may be any particulate metallic material. In an example, the metallic build material 16 may be a powder. In another example, the metallic build material 16 may have the ability to sinter into a continuous body to form the metallic part 50 (see, e.g., FIG. 2F) when heated 52 to the sintering temperature (e.g., a temperature ranging from about 850° C. to about 1400° C.). In some examples, discrete metallic build material 16 powder particles should no longer be visible in the metallic part 50 (FIG. 2F). After sintering the powder particles form a dense solid metallic part.

While an example sintering temperature range is described, it is to be understood that this temperature may vary, depending, in part, upon the composition and phase(s) of the metallic build material 16.

The applicator 24 may be scanned across the build area platform 12 in the direction indicated by the arrow 26, e.g., along the y-axis. The applicator 24 may be, for instance, an inkjet applicator, such as a thermal inkjet printhead, a piezoelectric printhead, or a continuous inkjet printhead, and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple print bars. The applicator 24 may also be scanned along the x-axis, for instance, in configurations in which the applicator 24 does not span the width of the build area platform 12 to enable the applicator 24 to deposit the binding agent 36 or marking agent 37 at selected locations over a large area of a layer of the metallic build material 16. The applicator 24 may thus be attached to a moving XY stage or a translational carriage (neither of which is shown) that moves the applicator 24 adjacent to the build area platform 12 in order to deposit the binding agent 36 or marking agent 37 in predetermined areas of a layer of the metallic build material 16 that has been formed on the build area platform 12 in accordance with the method(s) disclosed herein. The applicator 24 may include a plurality of nozzles (not shown) through which the binding agent 36 and/or marking agent 37 is to be ejected.

The applicator 24 may deliver drops of the binding agent 36 or marking agent 37 at a resolution ranging from about 300 dots per inch (DPI) to about 1200 DPI. In other examples, the applicator 24 may deliver drops of the binding agent 36 or marking agent at a higher or lower resolution. The drop velocity may range from about 2 m/s to about 24 m/s and the firing frequency may range from about 1 kHz to about 100 kHz. In one example, each drop may be in the order of about 10 picolitres (pl) per drop, although it is contemplated that a higher or lower drop size may be used. For example, the drop size may range from about 1 pl to about 400 pl. In some examples, applicator 24 is able to deliver variable size drops of the binding agent 36 or marking agent 37.

Each of the previously described physical elements may be operatively connected to a controller 28 of the printing system 10. The controller 28 may control the operations of the build area platform 12, the build material supply 14, the build material distributor 18, and the applicator 24. As an example, the controller 28 may control actuators (not shown) to control various operations of the 3D printing system 10 components. The controller 28 may be a computing device, a semiconductor-based microprocessor, a central processing unit (CPU), an application specific integrated circuit (ASIC), and/or another hardware device. Although not shown, the controller 28 may be connected to the 3D printing system components via communication lines.

The controller 28 manipulates and transforms data, which may be represented as physical (electronic) quantities within the printer's registers and memories, in order to control the physical elements to create the metallic part 50. As such, the controller 28 is depicted as being in communication with a data store 30. The data store 30 may include data pertaining to a metallic part 50 to be printed by the 3D printing system 10. The data for the selective delivery of the metallic build material particles 16 and the binding agent 36 and/or marking agent 37 may be derived from a model of the metallic part 50 to be formed. For instance, the data may include the locations on each layer of metallic build material particles 16 that the applicator 24 is to deposit the binding agent 36 and/or marking agent 37. In one example, the controller 28 may use the data to control the applicator 24 to selectively apply the binding agent 36 and/or marking agent 37. The data store 30 may also include machine readable instructions (stored on a non-transitory computer readable medium) that are to cause the controller 28 to control the amount of metallic build material particles 16 that is supplied by the build material supply 14, the movement of the build area platform 12, the movement of the build material distributor 18, or the movement of the applicator 24.

As shown in FIG. 1, the printing system 10 may also include a heater 32. In some examples, the heater 32 includes a conventional furnace or oven, a microwave, or devices capable of hybrid heating (i.e., conventional heating and microwave heating). This type of heater 32 may be used for heating the entire build material cake 44 (see FIG. 2E) after the printing is finished or for heating the patterned 3D printed object 42.

In some examples, patterning may take place in the printing system 10, and then the build material platform 12 with the patterned 3D printed object 42 thereon may be detached from the system 10 and placed into the heater 32 for the various heating stages. In other examples, the heater 32 may be a conductive heater or a radiative heater (e.g., infrared lamps) that is integrated into the system 10. These other types of heaters 32 may be placed below the build area platform 12 (e.g., conductive heating from below the platform 12) or may be placed above the build area platform 12 (e.g., radiative heating of the build material layer surface). Combinations of these types of heating may also be used. These other types of heaters 32 may be used throughout the 3D printing process. In still other examples, the heater 32' may be a radiative heat source (e.g., a curing lamp) that is positioned to heat each layer 34 (see FIG. 2C) after the binding agent 36 and/or marking agent 37 has been applied thereto. In the example shown in FIG. 1, the heater 32' is attached to the side of the applicator 24, which allows for printing and heating in a single pass. In some examples, both the heater 32 and the heater 32' may be used.

Referring now to FIGS. 2A through 2F, an example of the 3D printing method is depicted. Prior to execution of printing, the controller 28 may access data stored in the data store 30 pertaining to a metallic part that is to be printed. The controller 28 may determine the number of layers of metallic build material particles 16 that are to be formed, and the locations at which binding agent 36 and/or marking agent 37 from the applicator 24 is to be deposited on each of the respective layers.

In FIG. 2A, the build material supply 14 may supply the metallic build material particles 16 into a position so that they are ready to be spread onto the build area platform 12. In FIG. 2B, the build material distributor 18 may spread the supplied metallic build material particles 16 onto the build area platform 12. The controller 28 may execute control build material supply instructions to control the build material supply 14 to appropriately position the metallic build material particles 16, and may execute control spreader instructions to control the build material distributor 18 to spread the supplied metallic build material particles 16 over the build area platform 12 to form a layer 34 of metallic build material particles 16 thereon. As shown in FIG. 2B, one layer 34 of the metallic build material particles 16 has been applied.

The layer 34 has a substantially uniform thickness across the build area platform 12. In an example, the thickness of the layer 34 ranges from about 30 microns to about 300 microns, although thinner or thicker layers may also be used. For example, the thickness of the layer 34 may range from about 20 microns to about 500 microns. The layer thickness may be about 2× the particle diameter (as shown in FIG. 2B)

at a minimum for finer part definition. In some examples, the layer thickness may be about 1.2× (i.e., 1.2 times) the particle diameter.

Referring now to FIG. 2C, selectively applying the binding agent 36 and/or marking agent 37 at selected locations on a portion 38 of the metallic build material 16 continues. As illustrated in FIG. 2C, the binding agent 36 and marking agent 37 may be dispensed from the applicator 24. The applicator 24 may be a thermal inkjet printhead a piezoelectric printhead, or a continuous inkjet printhead, and the selectively applying of the binding agent 36 and/or marking agent 37 may be accomplished by the associated inkjet printing technique. As such, the selectively applying of the binding agent 36 and/or marking agent may be accomplished by thermal inkjet printing or piezo electric inkjet printing.

The controller 28 may execute instructions to control the applicator 24 (e.g., in the directions indicated by the arrow 26) to deposit the binding agent 36 and/or marking agent 37 onto predetermined portion(s) 38 of the metallic build material 16 that are to become part of a patterned 3D printed object 42 and are to ultimately be sintered to form the metallic part 50. The applicator 24 may be programmed to receive commands from the controller 28 and to deposit the binding agent 36 and/or marking agent 37 according to a pattern of a cross-section for the layer of the metallic part 50 that is to be formed. As used herein, the cross-section of the layer of the metallic part 50 to be formed refers to the cross-section that is parallel to the surface of the build area platform 12. In the example shown in FIG. 2C, the applicator 24 selectively applies the binding agent 36 and/or marking agent 37 on those portion(s) 38 of the layer 34 that are to be fused to become the first layer of the metallic part 50. As an example, if the 3D part that is to be formed is to be shaped like a cube or cylinder, the binding agent 36 will be deposited in a square pattern or a circular pattern (from a top view), respectively, on at least a portion of the layer 34 of the metallic build material particles 16.

Where the 3D part is to be marked with a detectable marker at a predetermined location, the marking agent 37 will be deposited at predetermined locations shown at "X" on the build material so that the marking agent can be incorporated into the final metal part in a predetermined arrangement that acts or forms the detectable marker (X'). The marking agent 37 may be applied to areas where the binding agent 36 is absent. For example, the binding agent 36 may be applied to delineate the regions where the marking agent 37 is or is to be applied. Alternatively, the binding agent 36 and marking agent 37 may both be applied to at least part of the predetermined arrangement that acts or forms the detectable marker. Here, the detectable marker will be formed by both the binding agent 36 and the marking agent 37.

When the binding agent 36 and/or marking agent 37 is selectively applied in the targeted portion(s) 38, the binder and/or marker infiltrate the inter-particles spaces among the metallic build material particles 16. The volume of the binding agent 36 and/or marking agent 37 that is applied per unit of metallic build material 16 in the patterned portion 38 may be sufficient to fill a major fraction, or most of the porosity existing within the thickness of the portion 38 of the layer 34.

It is to be understood that portions 40 of the metallic build material 16 that do not have the binding agent 36 or marking agent 37 applied thereto may not become part of the patterned 3D printed object 42 that is ultimately formed.

The processes shown in FIGS. 2A through 2C may be repeated to iteratively build up several patterned layers and to form the patterned 3D printed object (see FIG. 2E). At least one of the layers may be devoid of one of the marking agent 37 or the binding agent 36. For example, the marking agent 37 may only be present at selected locations of some of the layers and these layers will determine the locations where the finished part is marked.

FIG. 2D illustrates the initial formation of a second layer of metallic build material 16 on the layer 34 patterned with the binding agent 36 and/or marking agent 37 In FIG. 2D, following deposition of the binding agent 36 and/or marking agent onto predetermined portion(s) 38 of the layer 34 of metallic build material 16, the controller 28 may execute instructions to cause the build area platform 12 to be moved a relatively small distance in the direction denoted by the arrow 20. In other words, the build area platform 12 may be lowered to enable the next layer of metallic build material 16 to be formed. For example, the build material platform 12 may be lowered a distance that is equivalent to the height of the layer 34. In addition, following the lowering of the build area platform 12, the controller 28 may control the build material supply 14 to supply additional metallic build material 16 (e.g., through operation of an elevator, an auger, or the like) and the build material distributor 18 to form another layer of metallic build material particles 16 on top of the previously formed layer 34 with the additional metallic build material 16. The newly formed layer may be patterned with binding agent 36 and/or marking agent 37.

Referring back to FIG. 2C, the layer 34 may be exposed to heating using heater 32' after the binding agent 36 and/or marking agent is applied to the layer 34 and before another layer is formed. The heater 32' may be used to produce a stabilized or bound layer. Where a hydrated metal salt is used as the binder in the binding agent 36, heating to form the 3D printed object layer may take place at a temperature that is capable of dehydrating the hydrated metal salt, but that is not capable of melting or sintering the metallic build material 16. In this example, the processes shown in FIGS. 2A through 2C (including the heating of the layer 34) may be repeated to iteratively build up several layers and to produce the 3D printed object 42'. The patterned 3D printed object 42 can then be exposed to the processes described in reference to FIG. 2F.

It will be understood that the heaters 32, 32' can be one or both or a combination of overhead lamp(s) and/or lamps attached to moving carriage(s) (not all options are shown in the figures).

The cycle time when printing layer-by-layer can range from about 5 seconds to about 100 seconds. During this time a layer of metallic build material 34 is formed, binding agent 36 and/or marking agent 37 is delivered to the layer, and heaters 32, 32' heat the surface of the build material to a temperature that fuses the metallic build material by evaporating fluids from the agent and dehydrating the hydrated metal salt in the patterned 3D printed object 42.

In some examples, layers of metallic build material 16 and binding agent 36 and/or marking agent 37 can be heated layer-by-layer, every two layers, every three layers, or so forth, or once the build material cake 44 has been fully formed to then form the patterned 3D printed object 42.

Repeatedly forming and patterning new layers (without curing each layer) results in the formation of a build material cake 44, as shown in FIG. 2E, which includes the patterned 3D printed object 42 residing within the non-patterned portions 40 of each of the layers 34 of metallic build material 16. The patterned 3D printed object 42 is a volume of the build material cake 44 that is filled with the metallic build material 16 and the binding agent 36 and/or marking agent 37 within the inter-particle spaces. The remainder of the build material cake 44 is made up of the non-patterned metallic build material 16.

Also as shown in FIG. 2E, the build material cake 44 may be exposed to heat or radiation to generate heat, as denoted by the arrows 46. The heat applied may be sufficient to produce a stabilized and 3D printed object 42. In one example, the heat source 32 may be used to apply the heat to the build material cake 44. In the example shown in FIG. 2E, the build material cake 44 may remain on the build area platform 12 while being heated by the heat source 32. In another example, the build area platform 12, with the build material cake 44 thereon, may be detached from the applicator 24 and placed in the heat source 32. Any of the previously described heat sources 32 and/or 32' may be used.

In the example where the build material cake is exposed to heat or radiation to generate heat, the length of time at which the heat 46 is applied to the build material cake and the rate at which the patterned 3D printed object 42 is heated may be dependent, for example, on: characteristics of the heat or radiation source 32, 32', characteristics of the binder, characteristics of the metallic build material 16 (e.g., metal type or particle size), and/or the characteristics of the metallic part 50 (e.g., wall thickness). The patterned 3D printed object 42 may be heated at the dehydration temperature for a time period ranging from about 1 minute to about 360 minutes. In an example, this time period is about 30 minutes. In another example, this time period may range from about 2 minutes to about 240 minutes. The patterned 3D printed object 42 may be heated to the dehydration temperature at a rate of about 1° C./minute to about 10° C./minute, although it is contemplated that a slower or faster heating rate may be used. The heating rate may depend, in part, on: the binding agent 36 and/or marking agent 37 used, the size (i.e., thickness and/or area (across the x-y plane)) of the layer 34 of metallic build material 16, and/or the characteristics of the metallic part 50 (e.g., size or wall thickness).

Heating a patterned 3D printed metal layer or object 42 can cause the binding agent 36 and/or marking agent 37 to bind or coalesce into a continuous phase among the metallic build material particles 16 of the patterned 3D printed object 42. The continuous phase may act as an adhesive between the metallic build material particles 16 to form the stabilized, the patterned 3D printed metal layer or object 42.

Heating may also result in the evaporation of a significant fraction and in some instances all of the fluid from the patterned 3D printed metal layer or object 42. The evaporated fluid may include any of the binding or marking agent components. Fluid evaporation may result in some densification, through capillary action, of the 3D printed object 42.

The stabilized, 3D printed object 42 exhibits handleable mechanical durability. The 3D printed object 42 may then be extracted from the build material cake 44. The 3D printed object 42 may be extracted by any suitable means. In an example, the 3D printed object 42 may be extracted by lifting the 3D printed object 42 from the unpatterned metallic build material particles 16. An extraction tool including a piston and a spring may be used.

When the 3D printed object 42 is extracted from the build material cake 44, the 3D printed object 42 may be removed from the build area platform 12 and placed in a heating mechanism. The heating mechanism may be the heater 32.

In some examples, the 3D printed object 42 may be cleaned to remove unpatterned metallic build material particles 16 from its surface. In an example, the 3D printed object 42 may be cleaned with a brush and/or an air jet. Other examples of cleaning procedures include rotary tumbling or vibratory agitation in the presence of low density tumbling media, ultrasonic agitation in a liquid, or bead blasting.

After the extraction and/or the cleaning of the 3D printed object 42, may be treated e.g. by heating in various stages and then sintered to form the final metallic part 50, also as shown in FIG. 2F. Prior to sintering, heating may be performed e.g. to decompose the binder prior. For instance, where a polymer binder is employed, the polymer may be decomposed by heating and by products removed prior to sintering. Where a metal salt binder is employed, the binder may be decomposed by heating, leaving metallic portion within the part. The heating cycle may be tailored to e.g. the binder and build materials employed.

Heating to sinter is accomplished at a sintering temperature that is sufficient to sinter the remaining metallic build material particles 16. The sintering temperature is highly dependent upon the composition of the metallic build material particles 16.

The sintering heating temperature may also depend upon the particle size and time for sintering (i.e., high temperature exposure time). As an example, the sintering temperature may range from about 850° C. to about 2500° C. In another example, the sintering temperature is at least 900° C. An example of a sintering temperature for bronze is about 850° C., and an example of a sintering temperature for stainless steel is about 1300° C. While these temperatures are described as sintering temperature examples, it is to be understood that the sintering heating temperature depends upon the metallic build material 16 that is utilized, and may be higher or lower than the described examples. Heating at a suitable temperature sinters and fuses the metallic build material particles 16 to form a completed metallic part 50. For example, as a result of sintering, the density may go from 50% density to over 90%, and in some cases very close to 100% of the theoretical density.

The length of time at which the heat 52 for sintering is applied and the rate at which the part 42 is heated may be dependent, for example, on: characteristics of the heat or radiation source 32, characteristics of the binder and marking agent, characteristics of the metallic build material 16 (e.g., metal type or particle size), and/or the target characteristics of the metallic part 50 (e.g., wall thickness).

The 3D printed object 42 may be heated to affect binding. This heating can be performed over a time period ranging from about 10 minutes to about 72 hours or from about 30 minutes to about 12 hours. In an example, the time period is 60 minutes. In another example, the time period is 180 minutes. The 3D printed object 42 may be heated at a rate ranging from about 0.5° C./minute to about 20° C./minute.

After binding, the 3D printed object 42 may be heated at the sintering temperature for a sintering time period ranging from about 20 minutes to about 15 hours. In an example, the sintering time period is 240 minutes. In another example, the sintering time period is 360 minutes. The at least substantially hydrated metal salt free 3D printed object 42 may be heated to the sintering temperature at a rate ranging from about 1° C./minute to about 20° C./minute. In an example, the 3D printed object 42 is heated to the sintering temperature at a rate ranging from about 10° C./minute to about 20° C./minute. A high ramp rate up to the sintering temperature may be useful to produce a more favorable grain structure or microstructure. However, in some instances, slower ramp rates may be useful. As such, in another example, the 3D printed object 42 may be heated to the sintering temperature at a rate ranging from about 1° C./minute to about 3° C./minute. In yet another example, the 3D printed object 42 may be heated to the sintering temperature at a rate of about 1.2° C./minute. In still another example, the 3D printed object 42 may be heated to the sintering temperature at a rate of about 2.5° C./minute.

In some examples, the heat 52 for sintering is applied in an environment containing an inert gas, a low reactivity gas, a reducing gas, or a combination thereof.

The sintering may be accomplished in an environment containing an inert gas, a low reactivity gas, and/or a reducing gas so that the metallic build material 16 will sinter rather than undergoing an alternate reaction (e.g., an oxidation reaction) which would fail to produce the metallic part 50. Examples of inert gas include but are not limited to argon gas, or helium gas. An example of a low reactivity gas includes nitrogen gas, and examples of reducing gases include but are not limited to hydrogen gas, or carbon monoxide gas.

In some examples, the heat 52 for sintering is applied in an environment containing carbon in addition to an inert gas, a low reactivity gas, a reducing gas, or a combination thereof. The sintering may be accomplished in an environment containing carbon to reduce the partial pressure of oxygen in the environment and further prevent the oxidation of the metallic build material 16 during sintering. An example of the carbon that may be placed in the heating environment includes graphite rods. In other examples, a graphite furnace may be used.

In some examples, the heat 52 is applied in a low gas pressure or vacuum environment. The sintering may be accomplished in a low gas pressure or vacuum environment so that the continuous metal oxide phase thermally decomposes to the corresponding metal and/or to prevent the oxidation of the metallic build material 16. Moreover, sintering at the low gas pressure or under vacuum may allow for more complete or faster pore collapse, and thus higher density parts. However, vacuum may not be used during sintering when the metallic build material 16 (e.g., Cr) is capable of evaporating in such conditions. In an example, the low pressure environment is at a pressure ranging from about 1 E-6 Torr (1*10<6> Torr) to about 10 Torr.

Although not shown, the operations depicted in FIGS. 2E and 2F may be automated and the controller 28 may control the operations.

Definitions

As used in the present disclosure, the term "about" is used to provide flexibility to an endpoint of a numerical range. The degree of flexibility of this term can be dictated by the particular variable and is determined based on the associated description herein.

Amounts and other numerical data may be expressed or presented herein in a range format. It is to be understood that such a range format is used merely for convenience and brevity and thus should be interpreted flexibly to include not just the numerical values explicitly recited as the limits of the range, but also to include individual numerical values or sub-ranges encompassed within that range as if each numerical value and sub-range is explicitly recited.

As used in the present disclosure, the term "comprises" has an open meaning, which allows other, unspecified features to be present. This term embraces, but is not limited to, the semi-closed term "consisting essentially of" and the closed term "consisting of".

It is noted that, as used in this specification and the appended claims, the singular forms "a", "an" and "the" include plural referents unless the context clearly dictates otherwise.

Where selective jetting of an agent is performed based on a 3D object model, the 3D object model may comprise at least one of: a 3D object model created using Computer Aided Design (CAD) or similar software; or a file, for example, a Standard Tessellation Language file generated based on output of the CAD software, providing one or more processors of a 3D printer with instructions to form the 3D object

EXAMPLES

Example 1

In this Example, a commercially available Ag nanoparticle ink (NovaCentrix®) was used to alter the local properties of the 3D printed Cu parts. Two copper parts were printed: (i) a cylinder of 10 mm diameter and 3 mm height shown in FIG. 3, and (ii) a tile with dimensions 30×30×3 mm shown in FIG. 4.

The cylinder was printed with the label "HP". The tile was printed with a QR code. The "HP" label and OR code were printed using the Ag nanoparticle ink (250 to 500 dots per inch (dpi) and carriage speed of 17 inches per second (ips)). The Ag loading was estimated to be 3 to 7 wt. % in the sintered part. The print bed was kept at 70° C. during the print. The areas around each of the OR code and HP label were bound by copper nitrate binder.

Figure 3:
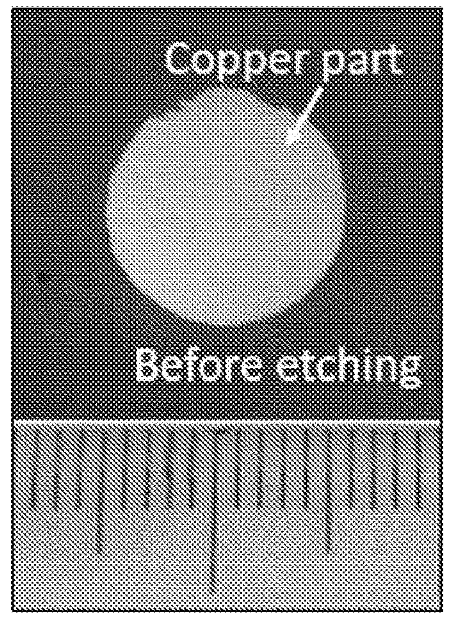
FIGS. 3 and 4 are images of the parts printed in Example 1.
Figure 3:
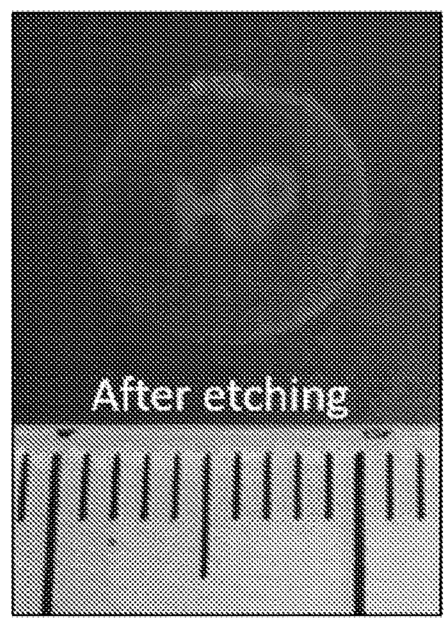
Figure 4:
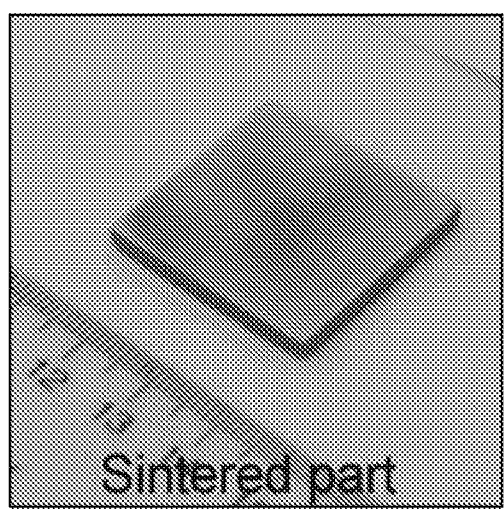
Figure 4:
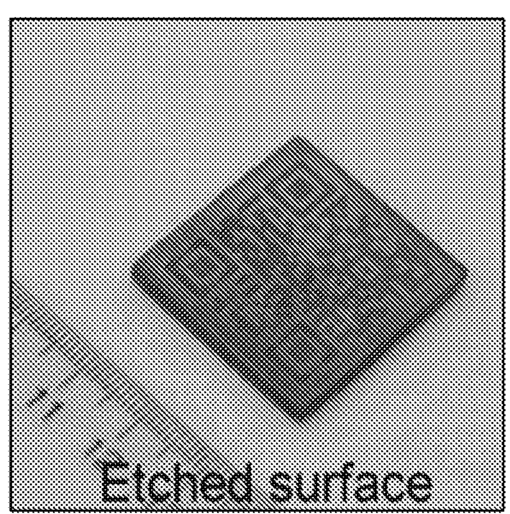

The 'HP' letters and OR code regions were printed at a depth of 300 to 500 microns from the upper surface of each of the parts. Thus, the "HP" label and OR code were not visible from the upper surface when the parts were first printed. However, when the upper surfaces of the parts were contacted with an etching solution (distilled water 100 ml+HCl 25 ml+$FeCl_3$ 5 gms), the "HP" letters and OR code were revealed. FIGS. 3 and 4 show images of the parts before and after etching.

Example 2

Figure 5:
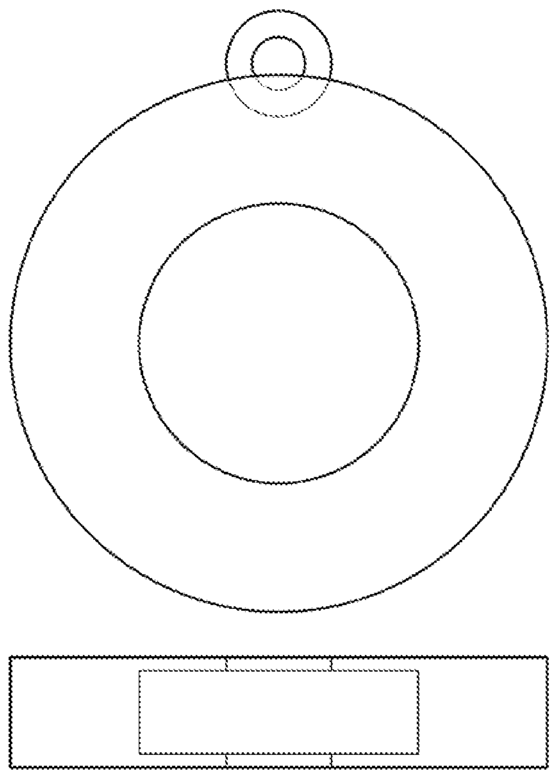
FIGS. 5 and 6 show the parts printed in Example 2.

In this Example, a disc of diameter 10 mm and 2 mm height was printed with a magnetic marker, X (see FIG. 5). A magnetic ink '(MICR ink) typically used for printing bank code lines on cheques was used to create an embedded magnetic region in the part, with copper nitrate as a binding agent. A loading of 5 to 10% wt $Fe_2O_3$ was estimated in the part prior to sintering.

The magnetic region was at 200 microns from the external surface of the part. The part was subject to the following sintering cycle in a reducing atmosphere (Ar—$H_2$).

The part was heated at a rate of 5° C./min from room temperature to 170° C. The heating rate was then reduced to 2.5° C./min until a temperature of 300° C. was reached. The temperature was held at 300° C. for 2 hours. Then the temperature was increased at a rate of 2.5° C./min to 500° C. The temperature was then held at 500° C. for 2 hours, and then increased once again at 2.5° C./min to 650° C., where it was held for 1 hour. Thereafter, the temperature was raised again at 2.5° C./min to 1000° C., where it was held for 30 minutes before being left to cool in the furnace.

The sintered part was then tested for a magnetic response using a neodymium magnet. The magnet attached to the printed part.

Figure 6:
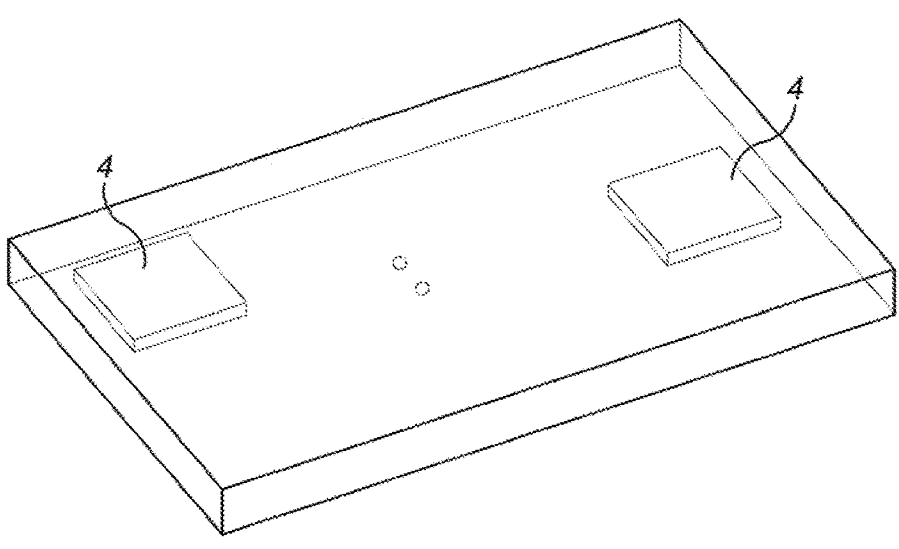

In another configuration, a magnetic pattern, Y, was embedded inside a rectangular copper part near the two corners, diagonally separated to each other (see FIG. 6). When tested with a magnet, the magnet attached to the part in the magnetic regions. The magnetic pattern was 500 microns from the outer surface of the part and not discernible by visual inspection.

Example 3

This Example was performed to gain a better understanding of the characteristic magnetic properties observed in Example 2.

Figure 7:
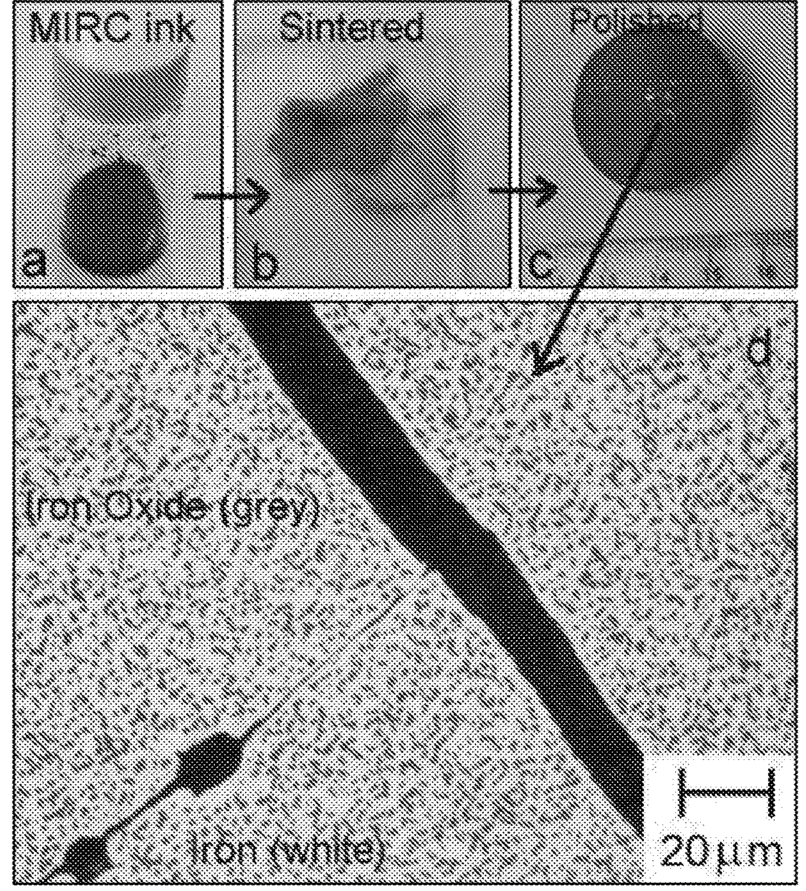
FIG. 7 shows an optical micrograph of the cross-section of a sintered MICR powder used in Example 3.

An MICR ink was annealed according to copper sintering cycle of Example 2 in a flow of forming gas (Ar—H2). The product after sintering was an agglomerate of powder. This sintered powder was mounted and polished for microscopy studies. FIG. 7 shows an optical micrograph of the cross-section of the sintered MICR powder. The discrete grey regions in the micrograph represent iron oxide particles, in the continuous matrix of iron. The hydrogen in the sintering atmosphere reduced a significant amount of iron oxide to iron (40-50% wt), which has about 3× higher saturation magnetization than the oxide.

Figure 8A:
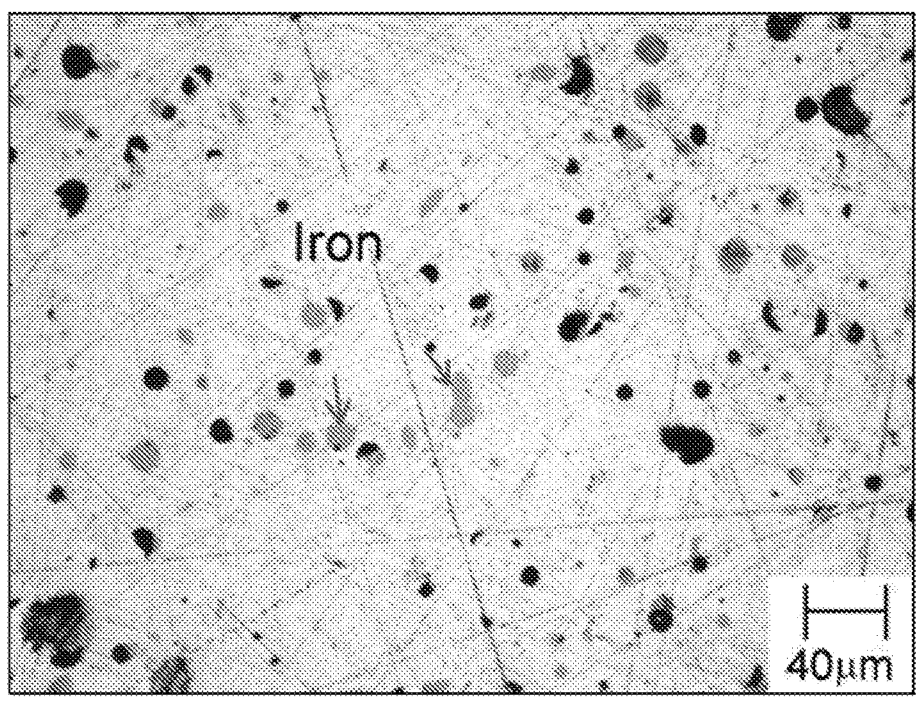
FIGS. 8*a* and 8*b* show optical micrographs of an example part printed in Example 3.
Figure 8B:
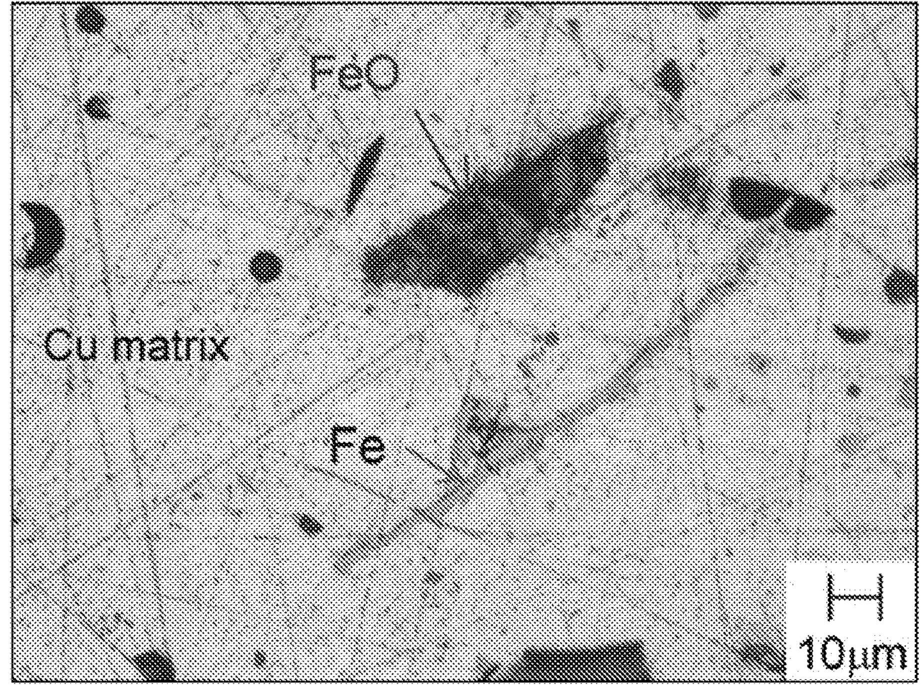

Iron oxide, printed in the copper part, similarly, gets partially reduced to iron during sintering in the forming gas atmosphere. The iron thus formed after reduction reaction with hydrogen was distributed uniformly in the copper matrix (FIG. 8*a*) and contributes to the magnetic properties. FIG. 8*b* shows a high magnification optical micrograph of the as-polished surface showing unreduced $FeO_x$ and Fe. The $FeO_x$ can be identified by the irregular surface features and grey contrast, and metallic iron appears bright and smoother within the copper matrix.

Example 4

Figure 9:
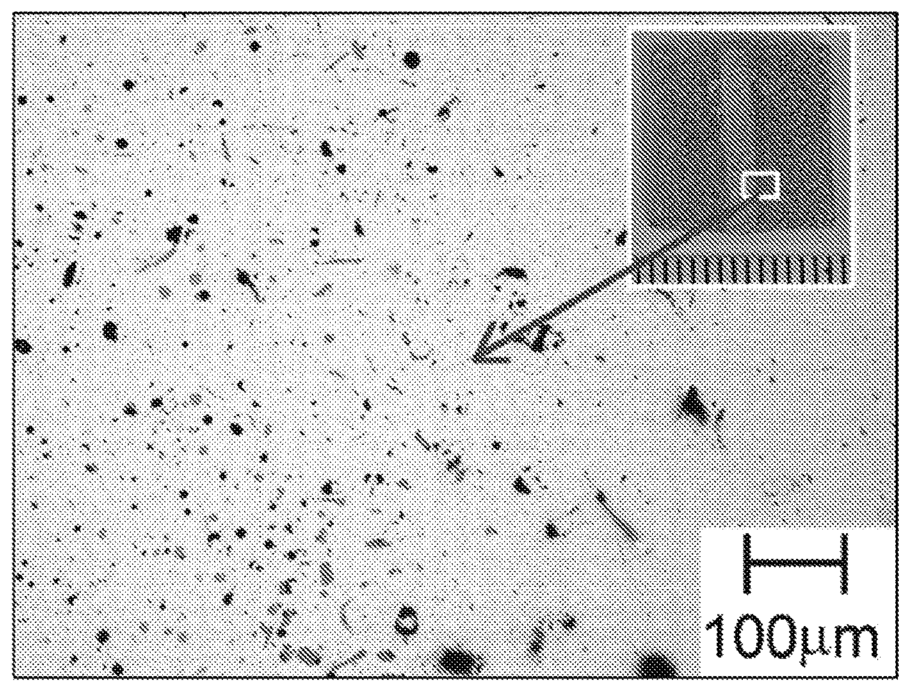
FIG. 9 shows an optical micrograph of an example part printed in Example 4.

A part with a central area was printed using MICR ink and copper nitrate binder. The part was sintered similarly in Ar—$H_2$ atmosphere mentioned above. The central area consists of reinforcement particles of Fe and $FeO_x$ in a matrix of Cu. FIG. 9 shows the optical micrograph at the interface region between with reinforcement and without reinforcements.

Figure 10:
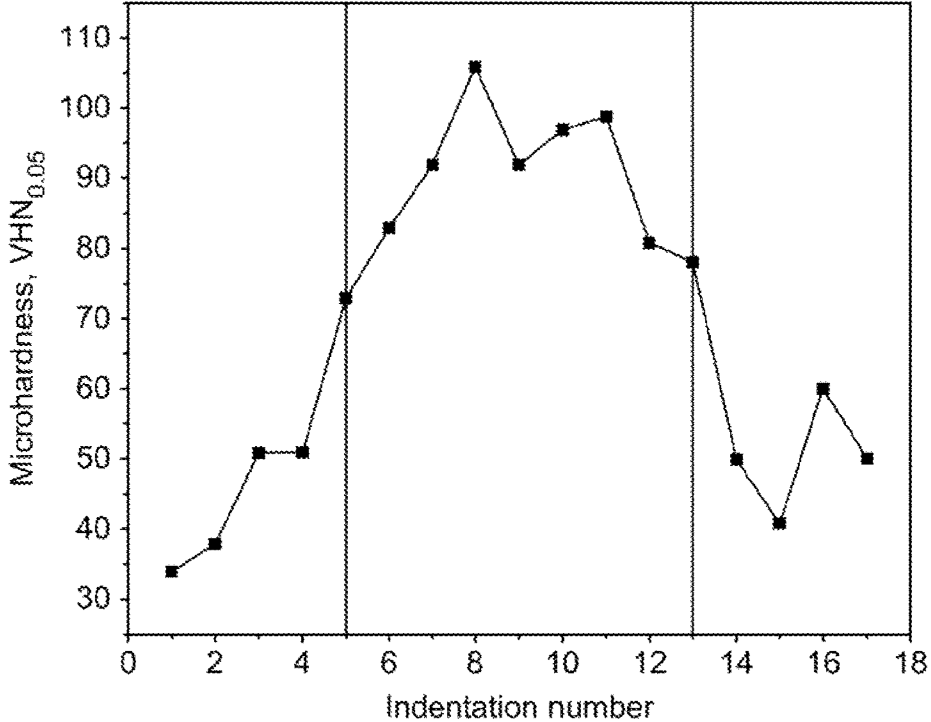
FIG. 10 is a graph showing the variation in hardness across a portion of the example part printed in Example 4.

Microhardness measurements were carried out across the region with reinforcement and without reinforcement, and the results were presented in FIG. 10. The region with reinforcement particles showed significantly higher hardness compared its counterpart. The variation in mechanical properties at predefined locations in the part can serve as a method to uniquely identify the part.

A predetermined pattern can then be made and tested for different parts to be able to obtain a unique ID. For instance, testing could be done every 2 mm with high hardness and low hardness providing the bits. In this way, a 12×12 grid could produce $\sim 10^{43}$ unique identifiers.

The invention claimed is:

1. A kit for 3D printing, the kit comprising:

build material particles comprising metal-containing particles and/or ceramic particles;

a jettable marking agent consisting of marking component nanoparticles dispersed in a non-aqueous liquid carrier, wherein the marking component nanoparticles are selected from the group consisting of:

pure metal nanoparticles selected from the group consisting of magnesium nanoparticles, aluminum nanoparticles, titanium nanoparticles, niobium nanoparticles, tantalum nanoparticles, vanadium nanoparticles, palladium nanoparticles, platinum nanoparticles, copper nanoparticles, silver nanoparticles, gold nanoparticles, cadmium nanoparticles, zinc nanoparticles, lead nanoparticles, and combinations thereof;

metal oxide nanoparticles selected from the group consisting of $Al_2O_3$, $TiO_2$, $Y_2O_3$, ZnO, and a combination thereof; and ceramic nanoparticles, wherein the marking component nanoparticles are i) different from the build material particles and ii) combinable with the build material particles to form an alloy or composite material during 3D printing; and a binding agent comprising a metal-containing binder dispersed in a liquid carrier, wherein when the marking component nanoparticles comprise the pure metal nanoparticles or the metal oxide nanoparticles, the metal-containing binder is different from the pure metal nanoparticles or the metal oxide nanoparticles of the marking agent.

2. The kit according to claim 1, wherein:

the build material particles are metal-containing particles, and wherein the metal-containing particles comprise copper-containing particles; and the marking component nanoparticles are pure metal nanoparticles, and wherein the pure metal nanoparticles are silver nanoparticles.

3. The kit according to claim 1, wherein the build material particles are the metal-containing particles, and wherein the metal-containing particles are the same as the metal-containing binder.

4. The kit according to claim 1, wherein the metal-containing binder is a metal salt.

5. The kit according to claim 1, wherein the marking component nanoparticles are the pure metal nanoparticles.

6. The kit according to claim 5, wherein the pure metal nanoparticles are selected from the group consisting of aluminum nanoparticles, titanium nanoparticles, niobium nanoparticles, tantalum nanoparticles, vanadium nanoparticles, magnesium nanoparticles, cadmium nanoparticles, lead nanoparticles, and combinations thereof.

7. The kit according to claim 1, wherein the marking component nanoparticles are the metal oxide nanoparticles.

8. The kit according to claim 7, wherein the metal oxide nanoparticles are selected from the group consisting of $Al_2O_3$, $TiO_2$, $Y_2O_3$, and a combination thereof.

9. A method of three-dimensional (3D) printing a 3D printed object, the method comprising:

selectively jetting a marking agent onto a first region of a layer of build material, wherein the build material comprises build material particles comprising metal-containing particles and/or ceramic particles, and wherein the marking agent consists of marking component nanoparticles dispersed in a non-aqueous liquid carrier with the marking component nanoparticles selected from the group consisting of:

pure metal nanoparticles selected from the group consisting of magnesium nanoparticles, aluminum nanoparticles, titanium nanoparticles, niobium nanoparticles, tantalum nanoparticles, vanadium nanoparticles, palladium nanoparticles, platinum nanoparticles, copper nanoparticles, silver nanoparticles, gold nanoparticles, cadmium nanoparticles, zinc nanoparticles, lead nanoparticles, and combinations thereof;

metal oxide nanoparticles selected from the group consisting of $Al_2O_3$, $TiO_2$, $Y_2O_3$, ZnO, and a combination thereof; and ceramic nanoparticles;

wherein the marking component nanoparticles are i) different from the build material particles and ii) combinable with the build material particles to form an alloy or composite material;

selectively jetting a binding agent onto at least a portion of the layer of the build material, the binding agent comprising a metal-containing binder dispersed in a liquid carrier, wherein when the marking component nanoparticles comprise the pure metal nanoparticles or the metal oxide nanoparticles, the metal-containing binder is different from the pure metal nanoparticles or the metal oxide nanoparticles of the marking agent; and binding the build material particles such that the marking component nanoparticles are incorporated into the 3D printed object in a predetermined arrangement and forms a detectable marker in the 3D printed object.

10. The method according to claim 9, further comprising sintering the build material after the binding.

11. The method according to claim 9, wherein the detectable marker is not detectable by visual inspection of the 3D printed object.

12. The method according to claim 9, wherein the detectable marker has characteristic magnetic properties and/or a characteristic hardness.

13. The method according to claim 9, wherein the detectable marker has a characteristic response to treatment with a chemical agent.

14. The method according to claim 9, wherein the detectable marker has a magnetic signature including encoded data that enables the 3D printed object to be identified, located, and/or tracked.

15. The method according to claim 14, wherein the detectable marker includes data in machine-readable form.

* * * * *